United States Patent
Zhou

(10) Patent No.: US 12,436,747 B2
(45) Date of Patent: Oct. 7, 2025

(54) METHOD FOR EXECUTING QUANTUM PROGRAM AND METHOD FOR COMPILING QUANTUM PROGRAM

(71) Applicants: SHENZHEN TENCENT COMPUTER SYSTEMS COMPANY LIMITED, Shenzhen (CN); INSTITUTE OF SOFTWARE CHINESE ACADEMY OF SCIENCES, Beijing (CN)

(72) Inventor: Xiangzhen Zhou, Shenzhen (CN)

(73) Assignees: SHENZHEN TENCENT COMPUTER SYSTEMS COMPANY LIMITED, Shenzhen (CN); INSTITUTE OF SOFTWARE CHINESE ACADEMY OF SCIENCES, Beijing (CN)

( * ) Notice: Subject to any disclaimer, the term of this patent is extended or adjusted under 35 U.S.C. 154(b) by 236 days.

(21) Appl. No.: 18/235,141

(22) Filed: Aug. 17, 2023

(65) Prior Publication Data
US 2024/0354074 A1  Oct. 24, 2024

Related U.S. Application Data

(63) Continuation of application No. PCT/CN2022/126780, filed on Oct. 21, 2022.

(30) Foreign Application Priority Data

Dec. 8, 2021  (CN) .................. 202111492774.7

(51) Int. Cl.
G06F 8/41  (2018.01)
(52) U.S. Cl.
CPC .................... *G06F 8/41* (2013.01)

(58) Field of Classification Search
CPC ......................................................... G06F 8/41
See application file for complete search history.

(56) References Cited

U.S. PATENT DOCUMENTS 10,223,084 B1  3/2019  Dunn
11,010,145 B1  5/2021  Smith et al.
(Continued)

FOREIGN PATENT DOCUMENTS

| CN | 110889507 A | 3/2020 |
| CN | 110929873 A | 3/2020 |

(Continued)

OTHER PUBLICATIONS

Tencent Technology, ISR, PCT/CN2022/126780, Jan. 18, 2023, 2 pgs.

(Continued)

*Primary Examiner* — Phillip H Nguyen
(74) *Attorney, Agent, or Firm* — Morgan, Lewis & Bockius LLP

(57) ABSTRACT

This application relates to a method for executing a quantum program and a method for compiling a quantum program performed by a computer device. The executing method includes: using an initial quantum circuit in a physical quantum circuit contained in a target quantum program as a current quantum circuit; executing the current quantum circuit to obtain a quantum measurement result; identifying a target quantum circuit matching the quantum measurement result from candidate quantum circuits having a connection relationship with the current quantum circuit; and using the target quantum circuit as the current quantum circuit by executing a mapping transformation circuit between the current quantum circuit and the target quantum circuit, and returning to the step of executing the current quantum circuit to obtain a quantum measurement result to continue execut- (Continued)

ing till a program executing result is obtained in response to meeting an executing termination condition.

16 Claims, 8 Drawing Sheets

(56) References Cited

U.S. PATENT DOCUMENTS

| | | | |
|---|---|---|---|
| 2020/0218842 A1 | 7/2020 | Itoko et al. | |
| 2021/0064350 A1 | 3/2021 | Cao | |
| 2021/0286601 A1 | 9/2021 | Fitzsimons et al. | |
| 2021/0334081 A1 | 10/2021 | Chong | |
| 2022/0284336 A1* | 9/2022 | Liu | G06N 10/40 |

FOREIGN PATENT DOCUMENTS

| | | | | |
|---|---|---|---|---|
| CN | 111767055 A | | 10/2020 | |
| CN | 112085204 A | | 12/2020 | |
| CN | 112668722 A | * | 4/2021 | |
| CN | 113537502 A | * | 10/2021 | G06N 10/20 |
| CN | 115907023 A | * | 4/2023 | G06N 10/20 |
| JP | 2006331249 A | | 12/2006 | |

OTHER PUBLICATIONS

Tencent Technology, WO, PCT/CN2022/126780, Jan. 18, 2023, 3 pgs.
Tencent Technology, IPRP, PCT/CN2022/126780, Jun. 5, 2024, 4 pgs.
Tencent Technology, Japanese Office Action, JP Patent Application No. 2023-538916, Jul. 2, 2024, 5 pgs.
Tencent Technology, Extended European Search Report, EP Patent Application No. 22903036.6, Aug. 26, 2024, 10 pgs.
Michael Cubeddu et al., "Introducing Control Flow in Qubit Allocation for Quantum Turing Machines", ARXIV.org, Cornell University Library, Jul. 2019, 8 pgs., https://arxiv.org/abs/1907.07113.
X. Fu et al., "eQASM: An Executable Quantum Instruction Set Architecture", IEEE, In Proceedings of the 25th International Symposium on High Performance Computer Architecture (HPCA), DOI: 10.1109/HPCA.2019.00040, Feb. 2019, 14 pgs.

* cited by examiner

METHOD FOR EXECUTING QUANTUM PROGRAM AND METHOD FOR COMPILING QUANTUM PROGRAM

CROSS-REFERENCE TO RELATED APPLICATIONS

This application is a continuation application of PCT Patent Application No. PCT/CN2022/126780, entitled "METHOD FOR EXECUTING QUANTUM PROGRAM AND METHOD FOR COMPILING QUANTUM PROGRAM" filed on Oct. 21, 2022, which claims priority to Chinese Patent Application No. 202111492774.7, entitled "METHOD FOR EXECUTING QUANTUM PROGRAM AND METHOD FOR COMPILING QUANTUM PROGRAM" filed on Dec. 8, 2021, all of which is incorporated herein by reference in its entirety.

FIELD OF THE TECHNOLOGY

This application relates to the technical field of quantum, in particular to a method and apparatus for executing a quantum program, a quantum computer, a storage medium and a computer program product, and a method and apparatus for compiling a quantum program, a quantum computer, a storage medium and a computer program product.

BACKGROUND OF THE DISCLOSURE

A quantum computer is a computer that uses a quantum bit as a basic storage unit and capable of executing a quantum program. In the quantum computer, connectivity between quantum bits is limited, so gate transformation of two quantum bits can be executed only between a specific quantum bit pair.

As for running of the quantum program in the quantum computer at present, a running task of the quantum program in the quantum computer is implemented by compiling the quantum program into a quantum circuit composed of basic gates and executable in the quantum computer and sequentially executing the compiled quantum circuit. However, as for a processing mode for the quantum program at present, only a quantum program with a simple flow can be run and processed in the quantum computer, and a complex quantum program with a control flow cannot be run in the quantum computer.

SUMMARY

According to various embodiments provided by this application, a method and apparatus for executing a quantum program, a quantum computer, a computer-readable storage medium and a computer program product, and a method and apparatus for compiling a quantum program, a quantum computer, a computer-readable storage medium and a computer program product are provided, which can implement executing according to a control flow.

This application provides a method for executing a quantum program. The method includes the following steps:

using an initial quantum circuit in a physical quantum circuit contained in a target quantum program as a current quantum circuit;

executing the current quantum circuit to obtain a quantum measurement result;

identifying a target quantum circuit matching the quantum measurement result from candidate quantum circuits having a connection relationship with the current quantum circuit, the connection relationship matching a control flow corresponding to the target quantum program; and using the target quantum circuit as the current quantum circuit by executing a mapping transformation circuit between the current quantum circuit and the target quantum circuit, and returning to the executing the current quantum circuit to obtain a quantum measurement result to continue executing till a program executing result is obtained in response to meeting an executing termination condition.

This application further provides a quantum computer. The quantum computer includes a memory and one or more processors, the memory storing a computer-readable instruction that, when executed by the one or more processors, causes the quantum computer to perform the steps of the above various method embodiments.

This application further provides a non-transitory computer-readable storage medium. The computer-readable storage medium stores a computer-readable instruction that, when being executed by one or more processors of a quantum computer, causes the quantum computer to perform the steps of above various method embodiments.

Details of one or more embodiments of this application are provided in the accompanying drawings and descriptions below. Other features, objectives, and advantages of this application will become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

Figure 1:
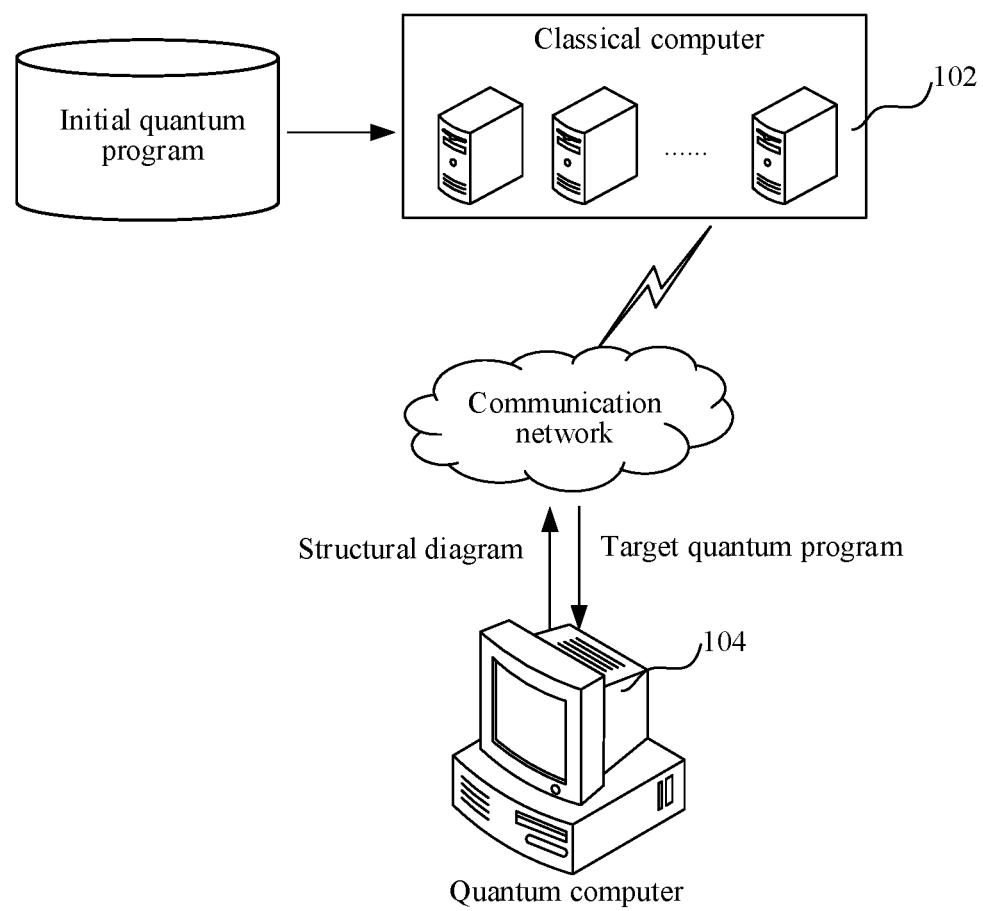
FIG. 1 is a diagram of an application environment of a method for executing a quantum program in an embodiment.

A method for executing a quantum program provided in an embodiment of this application may be applied to an application environment shown in FIG. 1. A classical computer 102 and a quantum computer 104 are included. The quantum computer 104 may perform communication with the classical computer 102 through a network. The quantum computer is a type of physical apparatus which conforms to a quantum mechanics law for performing high-speed mathematical and logical operations, and quantum information storage and processing. The classical computer is relative to the quantum computer, may be also called an ordinary computer and is a computing device developed maturely at present. Quantum bits in the quantum computer may be not fully connected, that is, only some quantum bits may be connected. The quantum computer can only execute a quantum operation between a quantum bit pair with a connected relationship or on a single quantum bit. In general, when a hybrid quantum algorithm is designed, a quantum bit connected relationship of the quantum computer is not considered, so a quantum program composed of logical quantum circuits possibly cannot be executed directly in the quantum computer. Accordingly, through transformation of the logical quantum circuits, transformed quantum circuits (for the sake of description, the transformed quantum circuits are called physical quantum circuits in following embodiments) may meet the quantum bit connected relationship, so as to be executed in the quantum computer. With reference to an application scenario shown in FIG. 1, a process of transforming an initial quantum program composed of the logical quantum circuits may be executed by the classical computer in FIG. 1.

In an embodiment, the classical computer is in communication connection with the quantum computer, the initial quantum program is stored in the classical computer, the classical computer transmits the initial quantum program to the quantum computer through interacting with the quantum computer, and the quantum computer stores its own quantum bit connected relationship. The quantum computer compiles the initial quantum program according to the quantum bit connected relationship of the quantum computer to obtain and execute a target quantum program containing the physical quantum circuits and a mapping transformation circuit.

In another embodiment, the classical computer is in communication connection with the quantum computer, and the classical computer obtains the initial quantum program and the quantum bit connected relationship of the quantum computer through interacting with the quantum computer. The classical computer transforms the logical quantum circuits according to the quantum bit connected relationship of the quantum computer to obtain the physical quantum circuits, and transmits the target quantum program composed of the physical quantum circuits to the quantum computer to be executed.

Specifically, the classical computer compiles the obtained quantum program according to the quantum bit connected relationship of the quantum computer to obtain a compiled target quantum program and transmits the compiled target quantum program to the quantum computer to be executed. A process of executing the target quantum program by the quantum computer is: using, by the quantum computer, an initial quantum circuit in the physical quantum circuits contained in the target quantum program as a current quantum circuit; executing the current quantum circuit to obtain a quantum measurement result; screening out or identifying a target quantum circuit matching the quantum measurement result from candidate quantum circuits having a connection relationship with the current quantum circuit, the connection relationship matching a control flow corresponding to the target quantum program; and using the target quantum circuit as the current quantum circuit by executing a mapping transformation circuit between the current quantum circuit and the target quantum circuit, and returning to the step of executing the current quantum circuit to obtain a quantum measurement result to continue executing till a program executing result is obtained in response to meeting an executing termination condition.

The classical computer 102 may be but is not limited to various personal computers, notebook computers, smartphones, tablet computers, Internet of Things devices and portable wearable devices. The Internet of Things devices may be a smart speaker, a smart television, a smart air-conditioner, a smart vehicle-mounted device and the like. The portable wearable devices may be a smartwatch, a smart bracelet, a head-mounted device and the like. The quantum computer 104 is a physical apparatus which conforms to a quantum mechanics law for performing high-speed mathematical and logical operations, and quantum information storage and processing.

Figure 2:
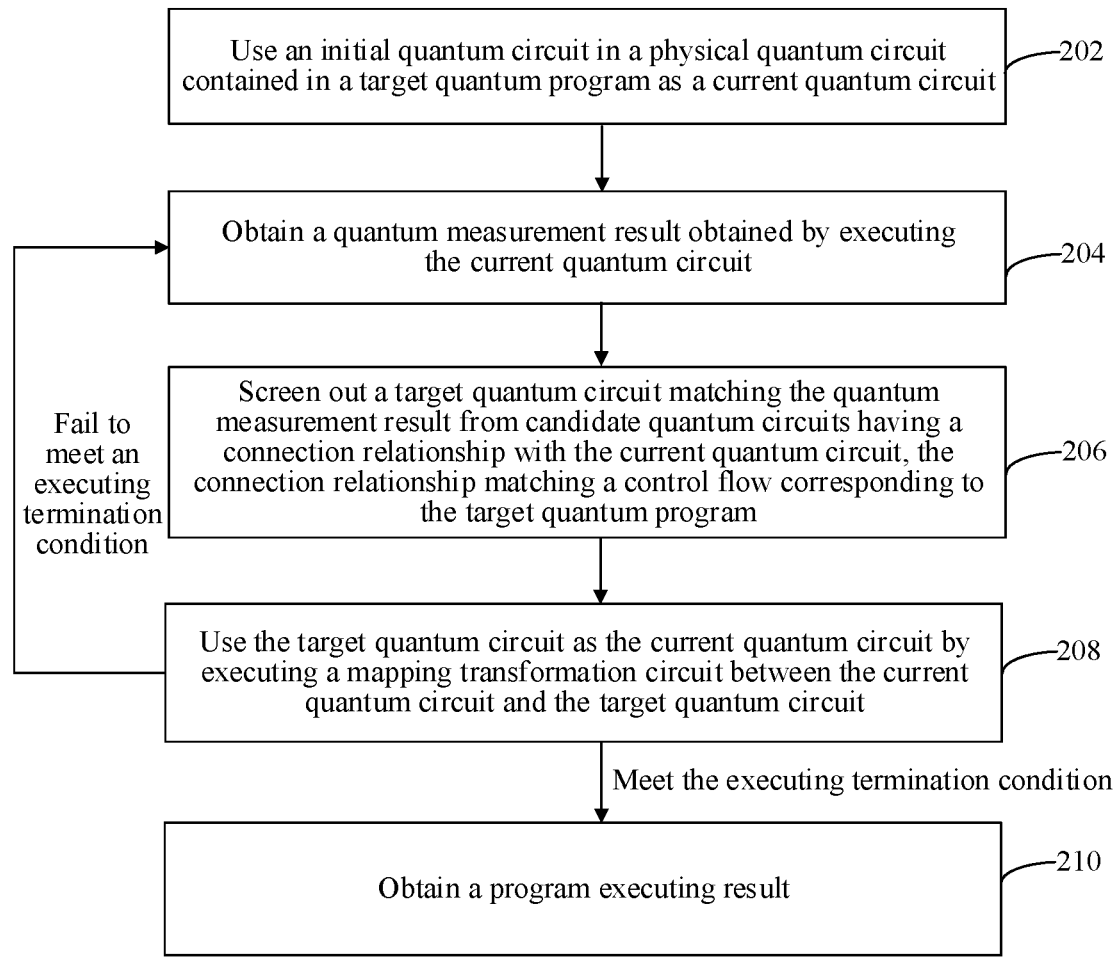
FIG. 2 is a schematic flowchart of a method for executing a quantum program in an embodiment.

In an embodiment, as shown in FIG. 2, a method for executing a quantum program is provided. Description is made by taking the method being applied to a quantum computer in FIG. 1 as an example, and the method includes the following steps:

Step 202: Use an initial quantum circuit in a physical quantum circuit contained in a target quantum program as a current quantum circuit.

The target quantum program is a quantum program which meets connectivity between quantum bits in the quantum computer and can be executed in the quantum computer. Specifically, the target quantum program may be a quantum program written according to the connectivity between the quantum bits in the quantum computer, or may also be a quantum program obtained by compiling an initial quantum program based on the connectivity between the quantum bits in the quantum computer for a pre-written initial quantum program. A control mode of executing for each quantum circuit in the target quantum program is classical control, and the classical control refers to a control mode that an executing action in a next step is judged in real time through an executing result in a previous step.

The quantum circuits are constituent parts of the quantum program, and one quantum program may include one quantum circuit or contain two or more quantum circuits. Each quantum circuit includes a plurality of quantum bits and a series of quantum gates and quantum measurement operations.

Figure 3:
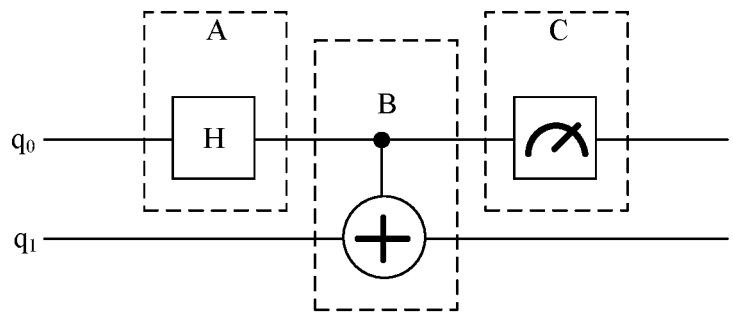
FIG. 3 is a schematic diagram of a quantum circuit in an embodiment.

The quantum bit is a basic unit of data storage of the quantum computer, and the quantum program implements a specific function by performing corresponding operations on the quantum bits. The quantum gate may change a state of the quantum bit on which the quantum gate acts, so that a specific quantum operation is implemented. The quantum gate may be divided into a single-quantum-bit gate and a two-quantum-bit gate according to the number of quantum bits acted on. The single-quantum-bit gate only acts on a specific quantum bit and may change a state of only the quantum bit. The two-quantum-bit gate acts on two quantum bits and may change states of the above two quantum bits, and the two-quantum-bit gate specifically includes a controlled-not gate, a swap gate and the like. In a quantum circuit shown in FIG. 3, the quantum circuit contains two quantum bits $q_0$ and $q_1$, each line represents the corresponding quantum bit, a module A represents a general single-quantum-bit gate acting on the quantum bit $q_0$, a module B represents a controlled-not gate acting on the quantum bits $q_0$ and $q_1$, and a module C represents performing a measurement operation on the quantum bit $q_0$.

There are two special quantum circuits in the target quantum program containing classical control, which are an initial quantum circuit and a termination quantum circuit respectively. The initial quantum circuit represents the first quantum circuit of the quantum program to be executed in an initial state, the termination quantum circuit represents that the quantum program is terminated after executing for the corresponding quantum circuit is finished, i.e., the final quantum circuit of the quantum program to be executed. The quantum computer may determine the initial quantum circuit and the termination quantum circuit in the quantum program based on recognition of a corresponding identity of the initial quantum circuit. The corresponding identity of the initial quantum circuit and a corresponding identity of the termination quantum circuit may be marked in a writing process of the quantum program.

Specifically, after obtaining a target quantum program meeting connectivity between quantum bits in the quantum computer, the quantum computer recognizes the initial quantum circuit from quantum circuits contained in the target quantum program, uses the initial quantum circuit as a current quantum circuit and performs a quantum operation on each quantum bit in the initial quantum circuit in sequence based on an arrangement order of quantum gates in the initial quantum circuit.

Step 204: Execute the current quantum circuit to obtain a quantum measurement result.

The current quantum circuit is a quantum circuit to be executed currently in an executing process of the quantum program, and the current quantum circuit changes based on the executing process. Specifically, after executing for the current quantum circuit is finished, a next to-be-executed quantum circuit is used as a new current quantum circuit.

Specifically, an executing process of the current quantum circuit is specifically: executing quantum operations corresponding to the quantum gates on states of quantum bits in sequence based on the arrangement order of the quantum gates in the quantum circuit being executed currently so as to change the states of the quantum bits. As the quantum operations of the quantum gates may change the states of the quantum bits acted on every time, the quantum measurement result for the same quantum bit every time may have a difference.

The quantum measurement result is a result obtained after performing quantum measurement processing for the quantum bit. A quantum measurement is a special quantum operation. A specific processing process of the quantum measurement includes that by performing certain adjustment and control on one or more particular quantum bits, a measurement result for the states of the quantum bits may be obtained, a value of the measurement result is random, and a probability of obtaining a certain result is related to the states of the measured quantum bits.

After performing the quantum measurement operation on the quantum bits, the states of the measured quantum bits also change randomly. Each quantum circuit in the target quantum program has the corresponding quantum measurement operation, and after executing for one quantum circuit is finished, according to the quantum measurement operation performed for the one or more quantum bits in the quantum circuit, the quantum measurement result is read so as to determine a quantum circuit to be executed subsequently.

Specifically, after determining the quantum circuit represented by the current quantum circuit, the quantum computer starts an executing process for the quantum circuit, executes the corresponding quantum operations through the quantum gates based on the arrangement order of the quantum gates in the quantum circuit so as to change the states of the quantum bits and reads the quantum measurement result corresponding to the quantum circuit from the quantum gates used for performing quantum measurement.

Step 206: Screen out a target quantum circuit matching the quantum measurement result from candidate quantum circuits having a connection relationship with the current quantum circuit, the connection relationship matching a control flow corresponding to the target quantum program.

The candidate quantum circuits are quantum circuits having the connection relationship with the current quantum circuit. Specifically, the quantum computer determines the quantum circuits having the connection relationship with the current quantum circuit based on the control flow corresponding to the target quantum program and uses the quantum circuits having the connection relationship as the candidate quantum circuits. The quantum measurement result may be represented by a character string, each character in the character string represents a measurement result of a measured target quantum bit, the number of digits of the character string may be related to the number of the measured target quantum bits, and the number of the measured target quantum bits may be determined based on the number of the candidate quantum circuits having the connection relationship with the current quantum circuit.

The control flow corresponding to the target quantum program is used for representing an executing order of the quantum circuits, connection relationships among the quantum circuits are determined based on a preset executing order, two quantum circuits to be executed in sequence are connected through the preset executing order among the quantum circuits, and thus the connection relationships between the quantum circuits are obtained. For example, during writing of the quantum program, it is set that the quantum circuit A is executed first and then the quantum circuit B is executed, so the quantum circuit A and the quantum circuit B are connected based on the set executing order, so that the connection relationship between the quantum circuit A and the quantum circuit B is determined. As connection relationship is one-way, and a plurality of quantum circuits may be connected with the same quantum circuit, and the same quantum circuit may also be connected with a plurality of quantum circuits. For example, the quantum circuit 1, the quantum circuit 2 and the quantum circuit 3 are all connected with the quantum circuit 4, and the quantum circuit 4 is connected with the quantum circuit 5 and the quantum circuit 6 respectively. The quantum computer, when finishing executing the quantum circuit 4, judges which of the quantum circuit 5 and the quantum circuit 6 is a next quantum circuit to be executed in real time based on a current executing result of the quantum circuit 4.

Specifically, the quantum computer screens out the target quantum circuit matching the quantum measurement result from the candidate quantum circuits based on the quantum measurement result corresponding to the current quantum circuit by determining the candidate quantum circuits having the connection relationship with the current quantum circuit. During specific application, the candidate quantum circuits having the connection relationship with the current quantum circuit may be determined with reference to a directed graph used for representing the control flow corresponding to the target quantum program.

Figure 4:
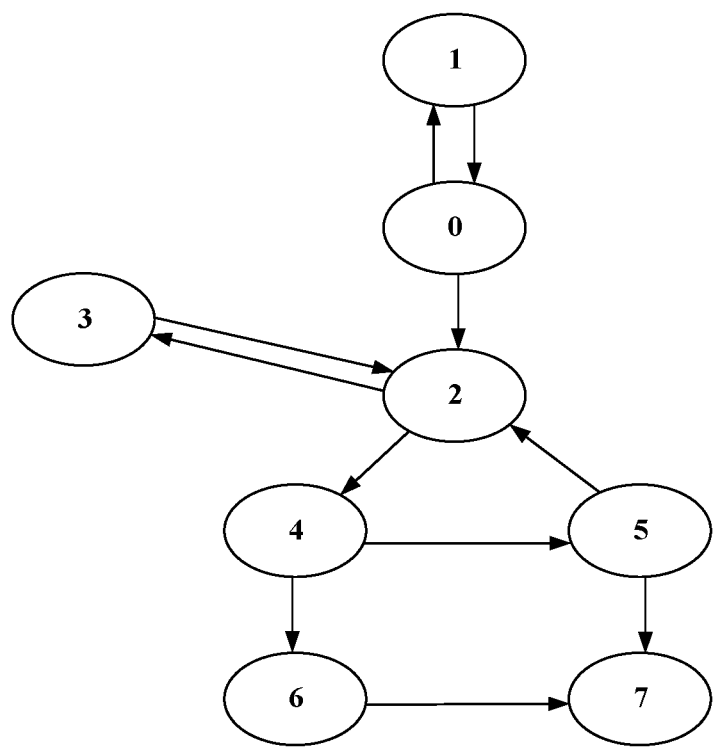
FIG. 4 is a schematic diagram of a directed graph corresponding to a control flow of a quantum program in an embodiment.

In a specific application, the control flow corresponding to the target quantum program may be represented by the directed graph, and a node in the directed graph represents a specific quantum circuit. An outgoing edge of each node corresponds to a quantum measurement result of the quantum circuit. A target node to which each outgoing edge points represents the quantum circuit to be executed subsequently when the measurement result is obtained. Besides, the directed graph also needs to define two special nodes, namely, an initial node and a termination node respectively. The initial node represents an initial quantum circuit of the quantum program to be executed in the initial state, the termination node represents a termination quantum circuit of the quantum program, an outgoing degree of the termination node is 0, and the outgoing degree refers to the number of outgoing edges of each node. As shown in FIG. 4, which is a directed graph representing a classical control flow; the node 0 is the initial node, and the node 7 is the termination node. The node 0 and the node 1 are connected through two directed arrows, and the outgoing edge of the node 0 pointing to the node 1 represents that the quantum circuit contained in the node 1 is executed after executing for the quantum circuit contained in the node 0 is finished. The outgoing edge of the node 1 pointing to the node 0 represents that the quantum circuit contained in the node 0 is executed after executing for the quantum circuit contained in the node 1 is finished.

Step 208: Use the target quantum circuit as the current quantum circuit by executing a mapping transformation circuit between the current quantum circuit and the target quantum circuit.

In response to meeting an executing termination condition, it returns to step 204 to continue executing, and in response to meeting the executing termination condition, it enters step 210.

Step 210: Obtain a program executing result.

The mapping transformation circuit is a middle circuit used for connecting two physical quantum circuits, and can implement transformation of a final quantum bit mapping relationship of a source physical quantum circuit and an initial quantum bit mapping relationship of a target physical quantum circuit. Switching of the physical quantum circuits is implemented by executing the mapping transformation circuit so as to update the current quantum circuit. The executing termination condition refers to an end condition ending the processing process of returning to the executing the current quantum circuit to obtain a quantum measurement result. Specifically, the executing termination condition may be that there is no candidate quantum circuit having the connection relationship with the current quantum circuit, that is, the current quantum circuit is the termination quantum circuit in the quantum program. An executing result obtained under the executing termination condition is a result of finishing executing all quantum circuits in the quantum program, namely, a result obtained after finishing executing a termination quantum program.

Specifically, the quantum computer uses the target quantum circuit as the current quantum circuit, obtains the quantum measurement result corresponding to the quantum circuit by executing the quantum circuit represented by the current quantum circuit, judges whether there are candidate quantum circuits having the connection relationship with the current quantum circuit, screens out the target quantum circuit matching the quantum measurement result from the candidate quantum circuits having the connection relationship with the current quantum circuit if a judgment result is yes, continues to use the target quantum circuit as the current quantum circuit to execute repeatedly till the judgment result is no, and feeds back an executing result of finishing executing the quantum program if the judgment result is no.

Through the above method for executing the quantum program, by using the initial quantum circuit in the physical quantum circuits contained in the target quantum program as the current quantum circuit, an executing starting point of the quantum program is determined, the quantum measurement result is obtained by executing the current quantum circuit, the target quantum circuit matching the quantum measurement result is screened out from the candidate quantum circuits having the connection relationship with the current quantum circuit, and screening of the target quantum circuit is performed through the quantum measurement result, so that executing for the quantum circuits based on the control flow is implemented: the target quantum circuit is used as the current quantum circuit by executing the mapping transformation circuit between the current quantum circuit and the target quantum circuit, so that connection executing among the different physical quantum circuits is implemented: by returning to the executing the current quantum circuit to obtain a quantum measurement result to continue executing till a program executing result is obtained in response to meeting an executing termination condition, a complex quantum program with a control flow can be executed by the quantum computer, occupation of data processing resources is simplified, and thus the quantum computer can accurately execute the complex quantum program with the control flow according to the control flow.

In an embodiment, the using the target quantum circuit as the current quantum circuit by executing a mapping transformation circuit between the current quantum circuit and the target quantum circuit, and returning to the step of executing the current quantum circuit to obtain a quantum measurement result to continue executing till a program executing result is obtained in response to meeting an executing termination condition includes: using the target quantum circuit as the current quantum circuit in response to that the target quantum circuit is not a termination quantum circuit, and returning to the step of executing the current quantum circuit to obtain a quantum measurement result to continue executing; and executing the termination quantum circuit in response to that the target quantum circuit is the termination quantum circuit to obtain an executing result of the target quantum program.

The termination quantum circuit refers to a final quantum circuit to be executed in the target quantum program, and a result after finishing executing the termination quantum circuit is the executing result of the target quantum program. The quantum computer may judge whether the target quantum circuit is the termination quantum circuit based on recognition of a corresponding identity of the termination quantum circuit. The corresponding identity of the termination quantum circuit may be marked in the writing process of the quantum program.

Specifically, in an iterative updating process of the current quantum circuit, the quantum computer may judge whether the target quantum circuit is the termination quantum circuit, uses the target quantum circuit as the current quantum circuit in response to that the target quantum circuit is not the termination quantum circuit, screens out the target quantum circuit matching the quantum measurement result from the candidate quantum circuits having the connection relationship with the current quantum circuit, executes circularly till the judgment result is that the target quantum circuit is the termination quantum circuit, and executes the termination quantum circuit in response to that the target quantum circuit is the termination quantum circuit to obtain the executing result of the target quantum program. Whether the target quantum circuit is the termination quantum circuit may be determined according to the corresponding identity of the quantum circuit and may also be determined according to whether there are candidate quantum circuits having the connection relationship.

During specific application, the quantum computer may determine whether to end circulation by judging whether the screened-out target quantum circuit is the termination quantum circuit, and obtains the executing result of the target quantum program by executing the termination quantum circuit when circulation is terminated, so that the quantum measurement result does not need to be obtained again during executing for the termination quantum circuit, and a data processing amount is reduced. The quantum computer may also determine whether to end the circulation by judging whether there are the candidate quantum circuits having connection relationship with the to-be-executed target quantum circuit, and directly obtain the executing result of the target quantum program when the circulation is terminated, judgment is made directly based on whether there are the candidate quantum circuits, a recognition process of the termination quantum circuit is simplified, and data processing efficiency is improved advantageously.

In this embodiment, by judging whether the target quantum circuit is the termination quantum circuit, the quantum computer uses the target quantum circuit as the current quantum circuit in response to that the target quantum circuit is not the termination quantum circuit and executes circularly by redetermining the target quantum circuit. By setting a condition of ending the circulation, it can be guaranteed that all the quantum circuits in the target quantum program are executed accurately according to the control flow, so that accuracy of the executing result of the target quantum program is improved.

In an embodiment, the method for executing the quantum program further includes: performing a quantum measurement operation on a target quantum bit in the current quantum circuit in response to an executing starting event for the current quantum circuit; and further, the executing the current quantum circuit to obtain a quantum measurement result includes: obtaining the quantum measurement result corresponding to the target quantum bit in response to finishing executing for the current quantum circuit.

The executing starting event refers to a trigger event of starting executing the quantum circuit represented by the current quantum circuit. Specifically, The quantum computer, when determining the target quantum circuit based on the quantum measurement result, uses the target quantum circuit as the current quantum circuit and automatically triggers the executing starting event for the target quantum circuit. The quantum measurement operation is a special quantum operation in the executing process of the quantum circuit, and an object of the quantum measurement operation is one or more target quantum bits in the quantum circuit. The target quantum bit may be set during design of the quantum program, the quantum measurement operation is an operation for a current state of the target quantum bit, and a process of the quantum measurement operation also changes the state of the measured target quantum bit. A value of the quantum measurement result is random, a probability of obtaining a certain result is related to the state of the measured quantum bit, and after measurement, the state of the measured quantum bit also changes randomly.

Specifically, the quantum computer performs the quantum measurement operation on the target quantum bit based on the quantum gates used for quantum measurement contained in the quantum circuit represented by the current quantum circuit in response to determining the executing starting event for the current quantum circuit triggered by the current quantum circuit. When executing for the quantum circuit represented by the current quantum circuit is finished, a quantum measurement result corresponding to the target quantum bit is obtained, and then an updated current quantum circuit is determined based on the quantum measurement result. During specific implementation, the quantum computer determines a target quantum gate used for performing a measurement operation in the current quantum circuit and the target quantum bit matching the target quantum gate in response to the executing starting event for the current quantum circuit, and performs the measurement operation on state data of the matching target quantum bit based on the target quantum gate to obtain updated state data and the quantum measurement result.

In this embodiment, the quantum computer performs the quantum measurement operation on the target quantum bit based on the quantum gates used for quantum measurement contained in the quantum circuit represented by the current quantum circuit in response to determining the executing starting event for the current quantum circuit triggered by the current quantum circuit, and obtains the quantum measurement result corresponding to the target quantum bit when executing for the current quantum circuit is finished, so that accuracy of the quantum measurement result is guaranteed.

In an embodiment, a plurality of target quantum bits are provided; and the obtaining the quantum measurement result corresponding to the target quantum bit in response to finishing executing for the current quantum circuit includes: reading binary bit data for representing the quantum measurement result respectively from each target quantum gate in response to finishing executing for the current quantum circuit, and using a binary bit string composed of each binary bit data as the quantum measurement result.

The binary bit data refer to bit data with a value being 0 or 1, the quantum measurement result is represented by a binary classical bit string, and the number of digits of the binary classical bit string is equal to the number of the measured quantum bits. As for all the measurement operations in the quantum program, connection relationships $(i, j_0), (i, j_1), \ldots, (i, j_{2^n-1})$ among the logical quantum circuits are determined, where i represents a serial number of the logical quantum circuit where the measurement operation is located, $j_m$ represents a serial number of the logical quantum circuit to be executed after m measurement results are obtained, and n represents the number of the measured quantum bits. For example, when the number of the logical quantum circuits having a connection relationship with the logical quantum circuit i is 4, the number of the measured target quantum bits may be 2, and when the number of the logical quantum circuits having the connection relationship with the logical quantum circuit i is 8, the number of the measured target quantum bits may be 3.

In this embodiment, by using the binary bit string composed of the binary bit data as the quantum measurement result, representing for the measurement result of the measured target quantum bits can be simplified, the number of the measured target quantum bits is effectively reduced, and processing efficiency of the quantum measurement process is improved.

In an embodiment, the method for executing the quantum program also includes a compiling process for the target quantum program. The compiling process for the target quantum program may be implemented in a classical computer, the classical computer transmits the target quantum program obtained through compiling to a quantum computer to be executed, or the compiling process for the target quantum program may also be implemented in the quantum computer, and the quantum computer directly executes the target quantum program obtained through compiling after compiling is completed.

The compiling process for the quantum program specifically includes: compiling, by the classical computer or the quantum computer, an initial quantum program according to a control flow of the initial quantum program based on an executing condition corresponding to a quantum program executing environment to obtain the target quantum program. Each physical quantum circuit contained in the target quantum program corresponds to each node of the control flow, and the mapping transformation circuits among all the physical quantum circuits correspond to connection relationships among all the nodes.

Figure 5:
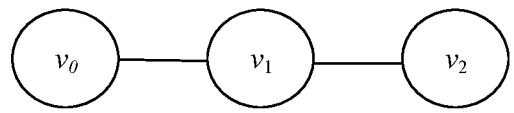
FIG. 5 is a structural diagram representing a connected relationship of physical quantum bits of a quantum computer in an embodiment.

The executing condition corresponding to the quantum program executing environment is determined by the quantum computer which executes the target quantum program, and different quantum computers may correspond to different executing conditions. The executing condition may be specifically a physical connected limited condition among all the quantum bits in the quantum computer. The physical connected limited condition may be represented by a structural diagram of the quantum computer. The structural diagram of the quantum computer is an undirected connected graph, nodes in the graph represent physical quantum bits, edges represent connection of the quantum bits, and gate transformation of two quantum bits may be executed between only the physical quantum bits which are directly connected with the edges. In an undirected connected graph shown in FIG. 5, gate transformation of the two quantum bits may be executed between only the physical bits ($v_0$, $v_1$) and ($v_1$, $v_2$), and corresponding gate transformation cannot be executed between ($v_0$, $v_2$).

The initial quantum program refers to a quantum algorithm designed without considering the physical connected limited condition of the quantum computer. Compiling refers to a processing process that the initial quantum program designed without considering the physical connected limited condition of the quantum computer is transformed into the target quantum program which can be executed in the quantum computer. The initial quantum program is composed of the logical quantum circuits, and the classical computer or the quantum computer may transform the initial quantum program composed of the logical quantum circuits, so that the transformed target quantum circuit meets limit of physical connectivity of the quantum computer so as to be executed in the quantum computer.

The control flow of the initial quantum program may be implemented through a subprogram used for deriving a classical control flow, so that a directed graph used for representing the control flow of the initial quantum program is obtained, and the quantum circuits and the connection relationships among the quantum circuits are represented by the nodes and directed connection relationships among the nodes in the directed graph.

During a specific application, the classical computer or the quantum computer executes the classical control flow deriving subprogram on the inputted initial quantum program, and a data processing process of the classical control flow deriving subprogram includes: generating a corresponding node for each logical quantum circuit in the initial quantum program, marking a node corresponding to an initial logical quantum circuit as an initial node, and a node corresponding to a termination logical quantum circuit as a termination node, and generating edges (i, $j_0$), (i, $j_1$), . . . , (i, $j_{2^n-1}$) for all measurement operations in the initial quantum program, where i represents a serial number of the logical quantum circuit node where the measurement operation is located, $j_m$ represents a serial number of the logical quantum circuit node to be executed after m measurement results are obtained, and n represents the number of the measured quantum bits; and obtaining the directed graph used for representing the control flow of the initial quantum program based on the generated nodes and the edges among the nodes. The classical computer or the quantum computer transforms the logical quantum circuits in the initial quantum program into the physical quantum circuits, and performs connection on the transformed physical quantum circuits based on the connection relationships among the logical quantum circuits represented by the directed graph to obtain the target quantum program.

In this embodiment, the classical computer or the quantum computer compiles the initial quantum program according to the control flow of the initial quantum program based on the executing condition corresponding to the quantum program executing environment to obtain the target quantum program, so that the quantum algorithm designed without considering the physical connected limited condition of the quantum computer can be transformed, by the compiling mode, into the target quantum program which can be executed in the quantum computer, a limiting condition during design of the quantum program is reduced, compiling can be performed for different quantum computers according to corresponding physical connected limited conditions, and not only is limit during design of the quantum program reduced, but also an applicable range of the quantum program is widened.

Figure 6:
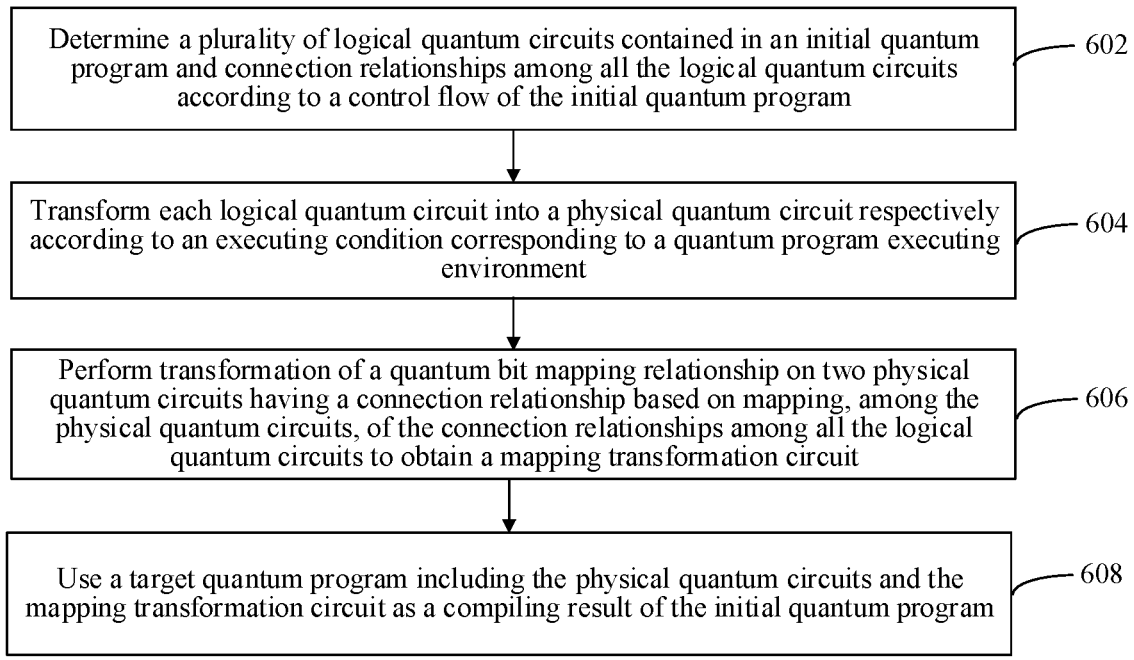
FIG. 6 is a schematic flowchart of a method for compiling a quantum program in an embodiment.

In an embodiment, as shown in FIG. 6, a method for compiling a quantum program is provided. The method for compiling the quantum program may also be used as a specific implementation process of compiling an initial quantum program containing a control flow according to an executing condition corresponding to a quantum program executing environment to obtain a target quantum program in the above method for executing the quantum program. Description is made by taking the method being applied to the quantum computer in FIG. 1 as an example, which includes the following steps:

Step 602: Determine a plurality of logical quantum circuits contained in an initial quantum program and connection relationships among all the logical quantum circuits according to a control flow of the initial quantum program.

Step 604: Transform each logical quantum circuit into a physical quantum circuit respectively according to an executing condition corresponding to a quantum program executing environment.

Step 606: Perform transformation of a quantum bit mapping relationship on two physical quantum circuits having a connection relationship based on mapping, among the physical quantum circuits, of the connection relationships among all the logical quantum circuits to obtain a mapping transformation circuit.

Step 608: Use a target quantum program including the physical quantum circuits and the mapping transformation circuit as a compiling result of the initial quantum program.

The executing condition corresponding to the quantum program executing environment includes a physical connected limited condition of a quantum computer, that is, meeting a quantum bit connected relationship of the quantum computer. In design of the quantum program, the quantum bit connected relationship of the quantum computer is usually not considered, transformation of a two-quantum-bit gate may be performed between any quantum bits in default, and a quantum circuit designed based on the above assumption is a logical quantum circuit, and quantum bits contained in the logical quantum circuit are logical quantum bits. Correspondingly, all two-quantum-bit gates in one quantum circuit meet a quantum bit connected relationship of a particular quantum computer, the quantum circuit is called a physical quantum circuit, and quantum bits contained in the physical quantum circuit are physical quantum bits.

Figure 7:
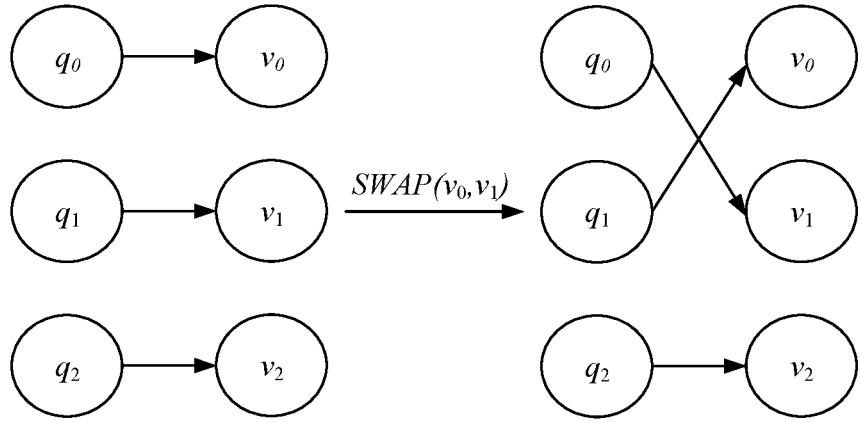
FIG. 7 is a schematic diagram of changing a quantum bit mapping relationship through a swap gate in an embodiment.

The logical quantum circuit may be transformed into the physical quantum circuit through quantum bit mapping based on the quantum bit connected relationship of the quantum computer. The quantum computer, when running the quantum program, needs to map the quantum bits in the logical quantum circuit onto the physical quantum bits, and this process is called quantum bit mapping. A determined quantum bit mapping may be changed by introducing a swap gate into the physical circuit, as shown in FIG. 7, an initial state of quantum bit mapping is $q_0$ being mapped to $v_0$, $q_1$ being mapped to $v_1$, and $q_2$ being mapped to $v_2$, and by introducing the swap gate SWAP ($v_0$, $v_1$), the quantum bit mapping may be transformed to $q_0$ being mapped to $v_1$, $q_1$ being mapped to $v_0$, and $q_2$ being mapped to $v_2$. One quantum bit mapping is represented by a symbol $\tau$, and $\tau(q)$ represents q the corresponding physical quantum bit of the logical quantum bit under this mapping.

The number of the logical quantum bits may be the same as the number of the physical quantum bits or not. When the number of the logical quantum bits is the same as the number of the physical quantum bits, the logical quantum bits may be in one-to-one correspondence with the physical quantum bits. As shown in FIG. 7, $q_0$ is mapped to $v_0$, $q_1$ is mapped to $v_1$, and $q_2$ is mapped to $v_2$ in FIG. 7. When the number of the logical quantum bits is not the same as the number of the physical quantum bits, the number of the physical quantum bits may be larger than the number of the logical quantum bits. In this case, the logical quantum bits may be mapped to part of physical quantum bits. For example, it is assumed that the quantum computer includes ten physical quantum bits, three physical quantum bits may be selected out of the ten physical quantum bits to be in one-to-one correspondence with the logical quantum bits.

A process of transforming each logical quantum circuit into the physical quantum circuit respectively is called quantum circuit transformation. The quantum circuit transformation refers to that in order to execute the quantum circuit in the particular quantum computer, according to a structural diagram of the physical quantum bits in the quantum computer, mapping of an initial quantum bit is determined first, then a redundant swap gate operation is introduced, the logical quantum circuit is transformed into the executable physical quantum circuit, so that the generated physical quantum circuit is equivalent to the logical quantum circuit in function, and the two-quantum-bit gates therein meet a connectivity limit of the structural diagram of the quantum computer.

The mapping transformation circuit is a quantum circuit used for implementing quantum bit mapping transformation. The quantum bit mapping transformation refers to transformation of two quantum bit mapping relationships. Specifically, it is a process that for two given quantum bit mapping relationships, one quantum bit mapping relationship is transformed into the other quantum bit mapping relationship by introducing a series of swap gate operations.

Specifically, by obtaining the initial quantum program, the classical computer or the quantum computer determines the plurality of logical quantum circuits contained in the initial quantum program and the connection relationships among all the logical quantum circuits according to the control flow of the initial quantum program, and establishes the directed graph with the logical quantum circuits as the nodes and the connection relationships among all the logical quantum circuits as connection edges among the nodes: performs quantum circuit transformation according to the executing condition corresponding to the quantum program executing environment based on each to-be-transformed node of the directed graph, so as to transform the logical quantum circuit represented by each to-be-transformed node into the physical quantum circuit respectively; and performs transformation of initial and final quantum bit mapping relationships on physical quantum circuits connected with each to-be-transformed connection edge based on each to-be-transformed connection edge of the directed graph to obtain the mapping transformation circuit. Specifically, the classical computer or the quantum computer may transform each logical quantum circuit into the physical quantum circuit respectively according to the executing condition corresponding to the quantum program executing environment for any non-transformed node of the directed graph, namely, the logical quantum circuit not transformed into the physical quantum circuit, till transformation for all the nodes in the directed graph is completed: then perform transformation of the initial and final quantum bit mapping relationships for any non-transformed edge, namely, two physical quantum circuits not subjected to quantum bit mapping relationship transformation and having a connection relationship, of the directed graph; and till transformation for all the non-transformed edges in the directed graph is completed, obtain a quantum program, namely, a compiled target quantum program, represented by a transformed directed graph based on the transformed directed graph with the nodes and the connection edges of the nodes.

In this embodiment, the classical computer or the quantum computer transforms the initial quantum program containing the classical control flow in a logical level into a series of physical quantum circuit sets which can be executed in the quantum computer in a compiling stage through quantum circuit transformation processing and initial and final quantum bit mapping relationship transformation processing. In an executing stage of the quantum program, the quantum computer can call the corresponding compiled next physical quantum circuit according to a measurement result for the physical quantum circuit, an executing process of the quantum program containing the classical control is reliably implemented, compiling can be made for the different quantum computers according to the corresponding physical connected limited conditions, a limit during design of the quantum program is reduced, and an applicable range of the quantum program is widened.

In an embodiment, the performing transformation of a quantum bit mapping relationship on two physical quantum circuits having a connection relationship based on mapping, among the physical quantum circuits, of the connection relationships among all the logical quantum circuits to obtain a mapping transformation circuit includes:

determining a connection relationship between the physical quantum circuits based on mapping, among the physical quantum circuits, of the connection relationships among all the logical quantum circuits: obtaining a final quantum bit mapping relationship corresponding to a source physical quantum circuit and an initial quantum bit mapping relationship corresponding to a target physical quantum circuit from the two physical quantum circuits having the connection relationship; and obtaining the mapping transformation circuit of transforming the final quantum bit mapping relationship into the initial quantum bit mapping relationship through mapping relationship transformation.

The swap gate may be also called a SWAP gate, an operation object of the SWAP gate is two quantum bits, and the SWAP gate plays a role in switching two quantum bits. Specifically, the classical computer or the quantum computer may implement mapping of the connection relationships among the physical quantum circuits based on the connection relationships among all the logical quantum circuits so as to determine the connection relationship between the physical quantum circuits, and may obtain the final quantum bit mapping relationship corresponding to the source physical quantum circuit and the initial quantum bit mapping relationship corresponding to the target physical quantum circuit from the two physical quantum circuits having the connection relationship based on quantum bits and quantum gates arranged in sequence for the two physical quantum circuits having the connection relationship as each physical quantum circuit includes a plurality of quantum bits and the quantum gates arranged in sequence. The corresponding physical quantum bits are determined through the final quantum bit mapping relationship and the initial quantum bit mapping relationship, the swap gate is introduced between the determined physical quantum bits to obtain the mapping transformation circuit, mapping relationship transformation of the final quantum bit mapping relationship and the initial quantum bit mapping relationship is implemented based on the mapping transformation circuit, thus connection between the physical quantum circuits also meets the corresponding quantum bit connected relationship of the quantum computer, and the physical quantum circuits can be executed in sequence.

In this embodiment, the classical computer or the quantum computer by obtains the final quantum bit mapping relationship corresponding to the source physical quantum circuit and the initial quantum bit mapping relationship corresponding to the target physical quantum circuit from the two physical quantum circuits having the connection relationship; and by introducing the swap gate, establishes the mapping transformation circuit to perform quantum bit mapping relationship transformation, so that connection of the two physical quantum circuits in the executing process can be achieved and reliability of the executing process of the quantum program can be improved.

In an embodiment, the obtaining the mapping transformation circuit of transforming the final quantum bit mapping relationship into the initial quantum bit mapping relationship through mapping relationship transformation includes:

determining, by the classical computer or the quantum computer, a first physical quantum bit from a structural diagram representing an executing condition, the first physical quantum bit being a physical quantum bit that does not affect a quantum bit connected relationship in the structural diagram after being removed from the structural diagram: determining a logical quantum bit corresponding to the first physical quantum bit based on the final quantum bit mapping relationship and determining a second physical quantum bit corresponding to the logical quantum bit based on the initial quantum bit mapping relationship: determining a connection path between a first quantum bit and a second quantum bit in the structural diagram; and introducing the swap gate according to the connection path to obtain the mapping transformation circuit of transforming the final quantum bit mapping relationship into the initial quantum bit mapping relationship.

The structural diagram is an undirected connected graph used for representing connectivity of all the physical quantum bits in the quantum computer. The nodes in the structural diagram represent each physical quantum bit in the quantum computer respectively, and the connection edges among the nodes represent that the physical quantum bits represented by the connected nodes have connectivity. The logical quantum bits are in one-to-one correspondence with the physical quantum bits through the mapping relationship, so the logical quantum bit corresponding to the first physical quantum bit may be determined based on the final quantum bit mapping relationship and the first physical quantum bit, and the second physical quantum bit corresponding to the logical quantum bit may also be determined based on the logical quantum bit and the initial quantum bit mapping relationship. The first physical quantum bit and the second physical quantum bit are two different quantum bit individuals, and during actual application, names of the first physical quantum bit and the second physical quantum bit may be interchangeable.

The connection path refers to a quantum bit set composed of a tail-end quantum bit, a middle quantum bit and an initial-end quantum bit obtained by adding the middle quantum bit to connect the tail-end quantum bit and the initial-end quantum bit for the tail-end quantum bit and the initial-end quantum bit which do not meet the quantum bit connected relationship corresponding to the quantum computer. Introducing the swap gate based on the connection path refers to introducing the swap gate between the adjacent quantum bits based on each quantum bit connected in sequence and represented by the connection path so as to achieve connection of the tail-end quantum bit and the initial-end quantum bit after being switched in sequence.

Specifically, the classical computer or the quantum computer establishes a path, marked as $(v_i, v_{k_0}, v_{k_1}, \ldots, v_{k_{l-2}}, v_j)$, between physical quantum bits $v_i$ and $v_j$ according to the quantum bit connected relationship corresponding to the quantum computer, where $v_{k_0}, v_{k_1}, \ldots, v_{k_{l-2}}$ is the middle quantum bit, $l$ is a path length, and swap gates $SWAP(v_i, v_{k_0})$, $SWAP(v_{k_0}, v_{k_1}) \ldots SWAP(v_{k_{l-2}}, v_j)$ of all the quantum bits in the connection path are introduced into the physical quantum circuit based on the established connection path, where the number of the introduced swap gates is the same as the path length.

In a specific application, the classical computer or the quantum computer takes out a target node, marked as $v_j$, from the structural diagram representing the quantum bit connected relationship of the quantum computer by constructing a null physical quantum circuit PC and simultaneously constructing current quantum bit mapping $\tau=\tau^{ini}$, which needs to meet that the structural diagram is still the connected graph after removing $v_j$, then the tail-end quantum bit q meeting $\tau^{fin}(q)=v_j$ is searched from the transformed physical quantum circuit, and the initial-end quantum bit is set to be $v_i=\tau(q)$; A path, marked as $(v_i, v_{k_0}, v_{k_1}, \ldots, v_{k_{l-2}}, v_j)$, between physical quantum bits $v_i$ and $v_j$ is constructed on the structural diagram, where l is the path length. SWAP($v_i$, $v_{k_0}$), SWAP($v_{k_0}$, $v_{k_1}$) ... SWAP($v_{k_{l-2}}$, $v_j$) are introduced into PC, $\tau$ is updated according to the introduced swap gates, so that quantum bit mapping transformation between the tail-end quantum bit and the initial-end quantum bit is implemented.

In this embodiment, by establishing the connection path, the classical computer or the quantum computer introduces the swap gate between the tail-end quantum bit and the initial-end quantum bit based on the connection path and performs quantum bit mapping transformation on the tail-end quantum bit and the initial-end quantum bit so that connection of the tail-end quantum bit and the initial-end quantum bit can be achieved and original executing logic is met, and thus the reliability of the executing process of the quantum program is improved.

In an embodiment, the transforming each logical quantum circuit into a physical quantum circuit respectively according to the executing condition corresponding to the quantum program executing environment includes: determining a quantum bit connected relationship corresponding to the quantum program executing environment based on the quantum program executing environment; and performing quantum circuit transformation on each logical quantum circuit according to the quantum bit connected relationship to obtain the physical quantum circuit.

The quantum program executing environment refers to an executing environment provided by the quantum computer used for executing the compiled target quantum program. The physical quantum bits in the different quantum computers have different connected relationships, so the quantum bit connected relationship corresponding to the quantum computer needs to be obtained after determining the quantum computer executing the target quantum program. Then quantum circuit transformation is performed based on the quantum bit connected relationship.

The quantum circuit transformation is a process that in order to execute the quantum circuit in the particular quantum computer, the logical quantum circuit is transformed into the executable physical quantum circuit according to the structural diagram representing the connected relationship between the physical quantum bits in the particular quantum computer. Specifically, one initial quantum bit mapping is determined for each logical quantum bit in the logical quantum circuit, the physical quantum bits which are in one-to-one correspondence with all the logical quantum bits in the logical quantum circuit are determined, then the redundant swap gate operation is introduced, the logical quantum circuit is transformed into the executable physical quantum circuit, so that the generated physical quantum circuit is equivalent to the logical quantum circuit in function, and the two-quantum-bit gates in the physical quantum circuit meet the connectivity limit of the structural diagram of the quantum computer.

Figure 8:
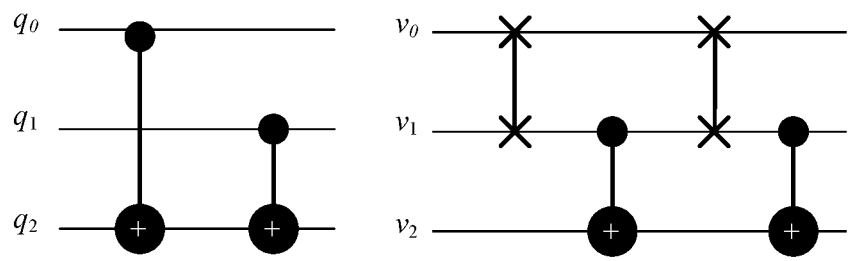
FIG. 8 is a schematic diagram of a quantum circuit transformation result in an embodiment.

In a specific application, as shown in FIG. 8, it is assumed that the logical quantum circuit includes the logical quantum bit $q_0$, $q_1$, $q_2$, and controlled-not gates CNOT($q_1$, $q_2$) and CNOT($q_0$, $q_2$), and the physical quantum bits in the quantum computer include $v_0$, $v_1$ and $v_2$, where $v_1$ is connected with $v_2$, and $v_0$ is connected with $v_1$. The process of the quantum circuit transformation includes: the initial quantum bit mapping is selected as $q_0$ being mapped to $v_0$, $q_1$ being mapped to $v_1$, and $q_2$ being mapped to $v_2$, SWAP ($v_0$, $v_1$) is introduced into the physical quantum circuit, the quantum bit mapping is changed to $q_0$ being mapped to $v_1$, $q_1$ being mapped to $v_0$ and $q_2$ being mapped to $v_2$, meanwhile CNOT ($v_1$, $v_2$) is introduced, and the gate corresponds to CNOT($q_0$, $q_2$) in the logical quantum circuit in function. SWAP($v_0$, $v_1$) is introduced into the physical quantum circuit, the quantum bit mapping is changed to $q_0$ being mapped to $v_0$, $q_1$ being mapped to $v_1$, and $q_2$ being mapped to $v_2$, meanwhile CNOT($v_1$, $v_2$) is introduced, the gate corresponds to CNOT ($q_1$, $q_2$) in the logical quantum circuit in function, and thus the logical quantum circuit is transformed into the physical quantum circuit with the same function.

In this embodiment, the classical computer or the quantum computer determines the quantum bit connected relationship corresponding to the quantum program executing environment based on the quantum program executing environment; and performs quantum circuit transformation on each logical quantum circuit according to the quantum bit connected relationship so that the physical quantum circuit obtained through transformation is the same as the logical quantum circuit in function and executable in the quantum program executing environment corresponding to the quantum computer, so that the reliability of executing the quantum program is improved.

In an embodiment, the performing quantum circuit transformation on each logical quantum circuit according to the quantum bit connected relationship to obtain the physical quantum circuit includes: sequentially determining, based on an arrangement order of each quantum gate in the logical quantum circuit, a target physical quantum bit having a mapping relationship with a logical quantum bit on which the quantum gate acts according to the quantum bit connected relationship: adding the quantum gate to the target physical quantum bit corresponding to the logical quantum bit acted on and removing the quantum gate from the logical quantum circuit; and obtaining the physical quantum circuit corresponding to the logical quantum circuit in response to that the number of quantum gates of the logical quantum circuit is zero.

The quantum gates are constituent parts of the quantum circuit. The quantum gates act on the quantum bits in the quantum circuit and are used for changing states of the quantum bits acted on so as to implement particular quantum operations. The quantum gate may be divided into a single-quantum-bit gate and a two-quantum-bit gate according to the number of quantum bits acted on. The single-quantum-bit gate only acts on a specific quantum bit and may change a state of only the quantum bit. The two-quantum-bit gate acts on two quantum bits and may change the states of the above two quantum bits, and the two-quantum-bit gate includes a controlled-not gate and a swap gate. All the quantum gates in the quantum circuit are arranged in sequence so as to represent the quantum operations performed on the quantum bits in sequence.

Specifically, the classical computer or the quantum computer maps the logical quantum bits on which the quantum gates act to the physical quantum bits meeting the quantum bit connected relationship in sequence based on the arrangement order of each quantum gate in the logical quantum circuit, so that the quantum operations same as the logical quantum bits can be implemented for the physical quantum bits in the physical quantum circuit. In order to accurately implement mapping for the logical quantum bits on which each quantum gate acts and achieve the same function in the physical quantum circuit after mapping, the quantum gate corresponding to the logical quantum bit whose mapping processing is completed is removed from the logical quantum circuit, and the quantum gate is added to the physical quantum bit having a mapping relationship with the logical quantum bit, so as to represent synchronous construction of the quantum gates. The number of the quantum gates in the logical quantum circuit is gradually reduced with removing processing, and when the number of the quantum gates of the logical quantum circuit is zero, the physical quantum circuit including each physical quantum bit and the quantum gates acting on the physical quantum bits are obtained.

In a specific application, the classical computer or the quantum computer constructs one initial quantum bit mapping $\tau^{ini}$ based on the logical quantum circuit LC and the structural diagram of the quantum computer, and the mapping is to map $q_i$ to $v_i$. Then a null physical quantum bit circuit PC is constructed, meanwhile, current quantum bit mapping $\tau = \tau^{ini}$ is constructed, the quantum gates of LC are arranged in sequence from left to right according to an executing order, the quantum gate is taken out from a leftmost side of the logical quantum circuit LC every time and marked as G( ), and the physical quantum bits which are in one-to-one mapping with the logical quantum bits are determined for the logical quantum bits on which G( ) acts till there is no available quantum gate in LC, that is, the number of the quantum gates in LC is 0.

In this embodiment, by performing mapping relationship transformation on the quantum bits on which the quantum gates act in sequence and adding the quantum gate for the physical quantum bits obtained through mapping, the physical quantum circuit obtained through transformation is the same as the logical quantum circuit in function, and the reliability of executing the quantum program is improved.

In an embodiment, the mapping the logical quantum bit on which the quantum gates act to the physical quantum bit meeting the quantum bit connected relationship includes: determining the physical quantum bit mapped by the logical quantum bit based on the quantum bit mapping relationship in response to that the quantum gate is a single-bit quantum gate with the number of logical quantum bits acted on being 1; and performing mapping relationship updating by constructing the quantum bit mapping relationship and introducing the swap gate and determining physical quantum bits mapped by logical quantum bits in response to that the quantum gate is a two-bit quantum gate with the number of logical quantum bits acted on being 2.

The single-quantum-bit gate refers to a quantum gate acting on one particular quantum bit and capable of changing the state of only the quantum bit. The two-quantum-bit gate refers to a quantum gate acting on the two quantum bits and capable of changing the states of the above two quantum bits.

Mapping modes of the physical quantum bits corresponding to the single-quantum-bit gate and the two-quantum-bit gate are different. Specifically, as an acting object of the single-quantum-bit gate is single and other quantum bits are not affected, the physical quantum bit corresponding to the logical quantum bit may be determined directly based on the constructed mapping relationship of the logical quantum bit and the physical quantum bit. Acting objects of the two-quantum-bit gate are two, the connected relationship of the quantum bits needs to be considered during executing, so the mapping relationship needs to be updated by introducing the swap gate, so that the physical quantum bits corresponding to the logical quantum bits after updating the mapping relationship can achieve quantum operations same as the logical quantum bits.

Specifically, the classical computer or the quantum computer judges whether the quantum gate is the single-quantum-bit gate or the two-quantum-bit gate according to the number of the logical quantum bits on which the quantum gate acts. When the quantum gate is the single-bit quantum gate with the number of the logical quantum bits acted on being 1, a mapping relationship corresponding to the logical quantum bit at present is searched, and the physical quantum bit mapped by the logical quantum bit is determined based on the mapping relationship obtained through searching. Specifically, if the mapping relationship of the logical quantum bit on which the single-bit quantum gate acts is not updated, the mapping relationship corresponding to the logical quantum bit at present is a constructed initial mapping relationship, and if the mapping relationship is updated, the mapping relationship corresponding to the logical quantum bit at present is an updated mapping relationship. Mapping relationship updating is performed by constructing the quantum bit mapping relationship and introducing the swap gate and physical quantum bits mapped by logical quantum bits are determined in response to that the quantum gate is a two-bit quantum gate with the number of logical quantum bits acted on being 2.

In a specific application, the classical computer or the quantum computer constructs one initial quantum bit mapping $\tau^{ini}$ based on the logical quantum circuit LC and the structural diagram of the quantum computer, the mapping is to map $q_i$ to $v_i$, then a null physical quantum circuit PC is constructed, and meanwhile, current quantum bit mapping $\tau = \tau^{ini}$ is constructed. For the quantum gate G( ) in the logical quantum circuit LC, if G( ) is the single-quantum-bit gate G(q) acting on the logical quantum bit q, G($\tau$(q)) is added to a tail position of PC, $\tau$(q) is the physical quantum bit mapped by the logical quantum bit q, and $\tau$ represents the mapping relationship. If G( ) is the two-quantum-bit gate G($q_i$, $q_j$) acting on the logical quantum bits ($q_i$, $q_j$), a path, marked as ($\tau(q_i), v_{k_0}, v_{k_1}, \ldots, v_{k_{l-2}}, \tau(q_j)$), between the physical quantum bits $\tau(q_i)$ and $\tau(q_j)$ is constructed, where l is the path length (L>2), SWAP($\tau(q_i)$, $v_{k_0}$), SWAP($v_{k_0}$, $v_{k_1}$) ... SWAP($v_{k_{l-3}}$, $v_{k_{l-2}}$) and G($v_{k_{l-2}}$, $\tau(q_j)$) are introduced into PC, and the mapping relationship t is updated according to the introduced swap gates.

In this embodiment, the classical computer or the quantum computer judges whether the quantum gate is the single-quantum-bit gate or the two-quantum-bit gate according to the number of the logical quantum bits on which the quantum gate acts. Different processing is performed for the different quantum bit gates. Because of the characteristic that the acting object of the single-quantum-bit gate is single, and other quantum bits are not affected, the physical quantum bit corresponding to the logical quantum bit is determined directly based on the constructed mapping relationship of the logical quantum bit and the physical quantum bit. Because of the characteristic that the acting objects of the two-quantum-bit gate are two and the connected relationship of the quantum bits needs to be considered during executing, the mapping relationship is updated by introducing the swap gate, so that the physical quantum bits corresponding to the logical quantum bits after updating the mapping relationship can achieve the quantum operations same as the logical quantum bits, and thus accuracy of executing the quantum program is improved.

In an embodiment, the performing mapping relationship updating by constructing the quantum bit mapping relationship and introducing the swap gate includes: mapping the two logical quantum bits on which the two-bit quantum gate acts into the first physical quantum bit and the second physical quantum bit by constructing an initial quantum bit mapping relationship: determining a connection path between the first physical quantum bit and the second physical quantum bit according to the quantum bit connected relationship; and introducing the swap gate based on the connection path and updating the initial quantum bit mapping relationship to obtain the updated quantum bit mapping relationship.

The first physical quantum bit and the second physical quantum bit are two different quantum bit individuals, and during actual application, the first physical quantum bit and the second physical quantum bit may be interchangeable. The initial quantum bit mapping relationship may be constructed randomly as long as a relationship of the physical quantum bits being one-to-one correspondence with the logical quantum bits is met. The connection path refers to a result that a middle quantum bit is added to connect two quantum bits which cannot be directly connected. Introducing the swap gate based on the connection path refers to introducing the swap gate between the adjacent quantum bits based on each quantum bit connected in sequence and represented by the connection path so as to achieve connection of the two quantum bits after being switched in sequence.

In a specific application, for the two-quantum-bit gate $G(q_i, q_j)$ acting on the logical quantum bits $(q_i, q_j)$, the physical quantum bits $\tau(q_i)$ and $\tau(q_j)$ mapped by the logical quantum bits $q_i$, $q_j$ are determined, and the path, marked as $(\tau(q_i), v_{k_0}, v_{k_1}, \ldots, v_{k_{l-2}}, \tau(q_j))$, between the physical quantum bits $\tau(q_i)$ and $\tau(q_j)$ is constructed on the structural diagram, where l is the path length (L>2). SWAP($\tau(q_i)$, $v_{k_0}$), SWAP ($v_{k_0}$, $v_{k_1}$) ... SWAP($v_{k_{l-3}}$, $v_{k_{l-2}}$) and $G(v_{k_{l-2}}, \tau(q_j))$ are introduced into the constructed null physical quantum circuit PC, connection of the physical quantum bits $\tau(q_i)$ and $\tau(q_j)$ is achieved, and the mapping relationship $\tau$ is updated according to the introduced swap gates, that is, the physical quantum bit mapped by the logical quantum bit $q_i$ is updated from $\tau(q_i)$ to $v_{k_{l-2}}$.

In this embodiment, the physical quantum bits are connected by constructing the connection path and adding the middle quantum bit, the swap gate is introduced between the adjacent quantum bits based on each quantum bit connected in sequence and represented by the connection path, updating of the mapping relationship is implemented, so that the physical quantum bits after being switched in sequence and performing mapping updating are connected, corresponding operations of the original logical quantum bits can be achieved, and the accuracy of the executing result of the quantum program is guaranteed.

Figure 9:
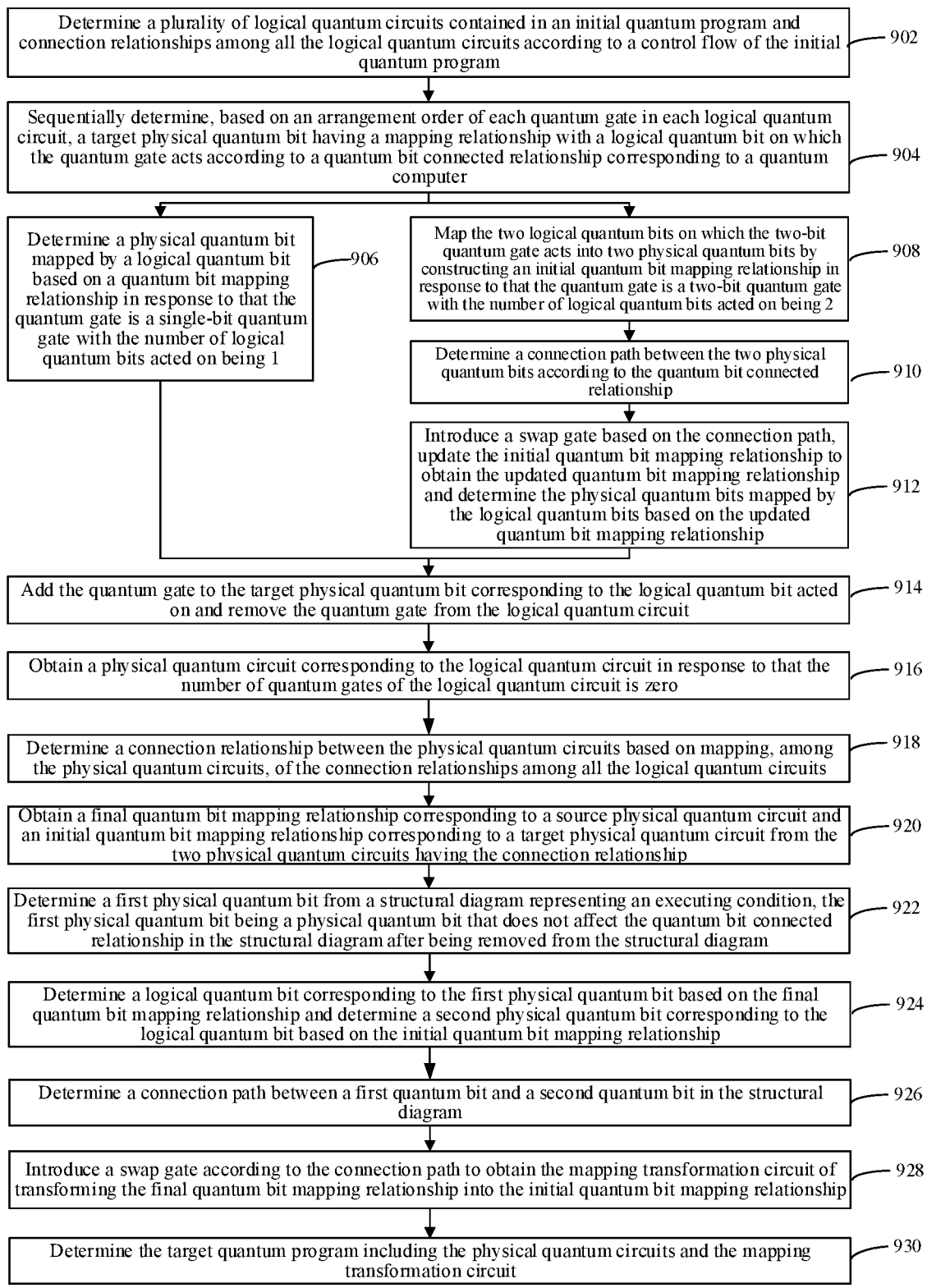
FIG. 9 is a schematic flowchart of a method for compiling a quantum program in an embodiment.

In a specific embodiment, as shown in FIG. 9, the method for compiling the quantum program is provided and includes the following compiling process of the quantum program. The compiling process of the quantum program may be implemented through the classical computer or the quantum computer. The process of compiling the quantum program by the classical computer or the quantum computer specifically includes the following steps:

Step 902: Determine a plurality of logical quantum circuits contained in an initial quantum program and connection relationships among all the logical quantum circuits according to a control flow of the initial quantum program.

Step 904: Sequentially determine, based on an arrangement order of each quantum gate in each logical quantum circuit, a target physical quantum bit having a mapping relationship with a logical quantum bit on which the quantum gate acts according to the quantum bit connected relationship corresponding to the quantum computer.

Step 906: Determine a physical quantum bit mapped by a logical quantum bit based on the quantum bit mapping relationship in response to that the quantum gate is a single-bit quantum gate with the number of logical quantum bits acted on being 1.

Step 908: Map the two logical quantum bits on which the two-bit quantum gate acts into two physical quantum bits by constructing the initial quantum bit mapping relationship in response to that the quantum gate is a two-bit quantum gate with the number of logical quantum bits acted on being 2.

Step 910: Determine a connection path between the two physical quantum bits according to the quantum bit connected relationship.

Step 912: Introduce the swap gate based on the connection path, update the initial quantum bit mapping relationship to obtain the updated quantum bit mapping relationship and determine the physical quantum bits mapped by the logical quantum bits based on the updated quantum bit mapping relationship.

Step 914: Add the quantum gate to the target physical quantum bit corresponding to the logical quantum bit acted on and remove the quantum gate from the logical quantum circuit.

Step 916: Obtain the physical quantum circuit corresponding to the logical quantum circuit in response to that the number of quantum gates of the logical quantum circuit is zero.

Step 918: Determine a connection relationship between the physical quantum circuits based on mapping, among the physical quantum circuits, of the connection relationships among all the logical quantum circuits.

Step 920: Obtain a final quantum bit mapping relationship corresponding to a source physical quantum circuit and an initial quantum bit mapping relationship corresponding to a target physical quantum circuit from the two physical quantum circuits having the connection relationship.

Step 922: Determine a first physical quantum bit from the structural diagram representing the executing condition, the first physical quantum bit being a physical quantum bit that does not affect the quantum bit connected relationship in the structural diagram after being removed from the structural diagram.

Step 924: Determine a logical quantum bit corresponding to the first physical quantum bit based on the final quantum bit mapping relationship and determine a second physical quantum bit corresponding to the logical quantum bit based on the initial quantum bit mapping relationship.

Step 926: Determine a connection path between a first quantum bit and a second quantum bit in the structural diagram.

Step 928: Introduce a swap gate according to the connection path to obtain the mapping transformation circuit of transforming the final quantum bit mapping relationship into the initial quantum bit mapping relationship.

Step 930: Determine the target quantum program including the physical quantum circuits and the mapping transformation circuit.

Figure 10:
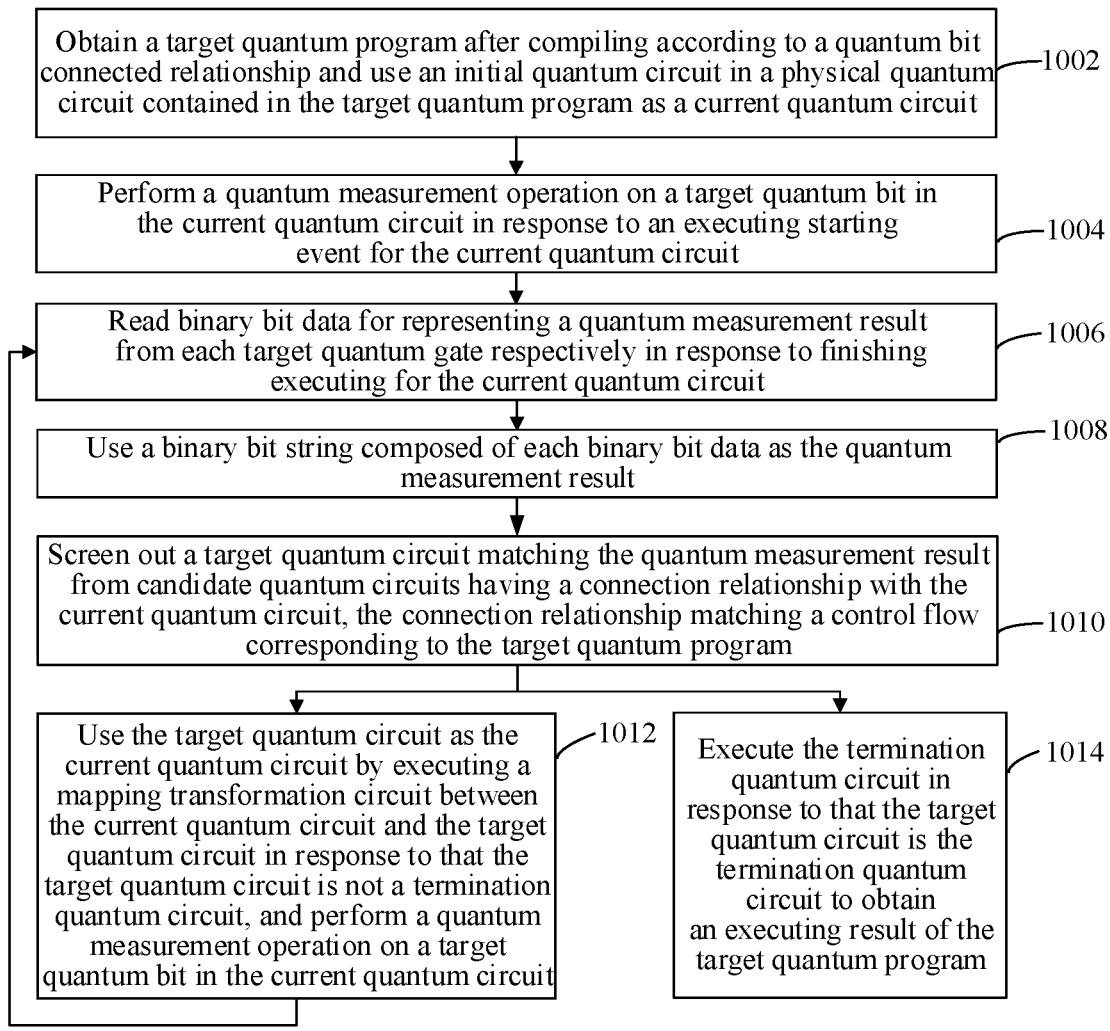
FIG. 10 is a schematic flowchart of a method for executing a quantum program in an embodiment.

In a specific embodiment, as shown in FIG. 10, the method for executing the quantum program is provided and includes the following executing process of the quantum program. The executing process of the quantum program may be implemented through the quantum computer and specifically includes the following steps:

Step 1002: Obtain the target quantum program after compiling according to the quantum bit connected relationship and use the initial quantum circuit in the physical quantum circuit contained in the target quantum program as the current quantum circuit.

Step 1004: Perform the quantum measurement operation on the target quantum bit in the current quantum circuit in response to the executing starting event for the current quantum circuit.

Step 1006: Read binary bit data for representing the quantum measurement result from each target quantum gate respectively in response to finishing executing for the current quantum circuit.

Step 1008: Use a binary bit string composed of each binary bit data as the quantum measurement result.

Step 1010: Screen out a target quantum circuit matching the quantum measurement result from candidate quantum circuits having a connection relationship with the current quantum circuit, the connection relationship matching a control flow corresponding to the target quantum program.

Step 1012: Use the target quantum circuit as the current quantum circuit by executing the mapping transformation circuit between the current quantum circuit and the target quantum circuit in response to that the target quantum circuit is not the termination quantum circuit, perform the quantum measurement operation on the target quantum bit in the current quantum circuit and return to step 1006.

Step 1014: Execute the termination quantum circuit in response to that the target quantum circuit is the termination quantum circuit to obtain the executing result of the target quantum program.

This application further provides an application scenario applying the above method for executing the quantum program. Specifically, application of the method for executing the quantum program in the application scenario is as follows.

The executing process of the quantum program contains two stages of compiling and executing and serves as a constituent part from quantum computing software to a hardware interface. In the compiling stage, the quantum algorithm containing the classical control flow in a logical level may be transformed into a series of executable physical quantum circuit sets. In the executing stage, a corresponding compiled physical quantum circuit is called according to the measurement result, and the executing process of the quantum program containing the classical control may be implemented reliably.

Figure 11:
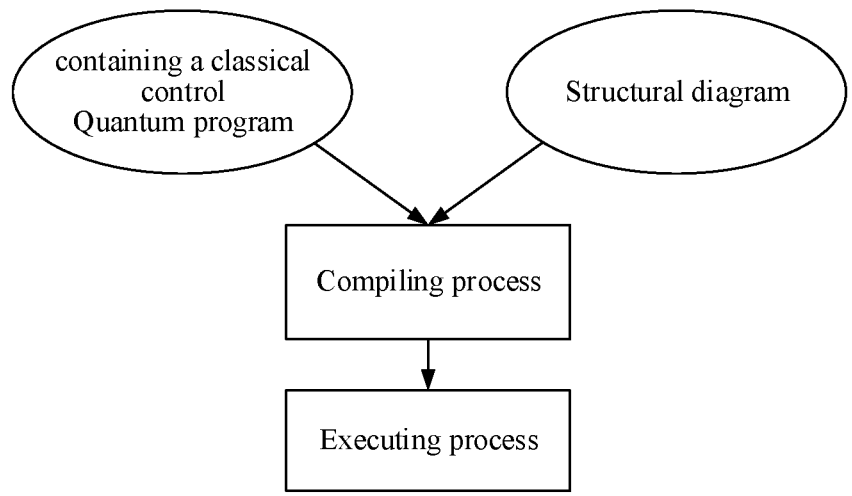
FIG. 11 is a schematic diagram of a relationship between a compiling process and an executing process of a quantum program in an embodiment.

As shown in FIG. 11, processing of the quantum program contains the compiling process and the executing process. Input data are one initial quantum program containing the classical control and one structural diagram corresponding to the quantum computer and used for representing the connected relationship of the physical quantum bits in the quantum computer, so as to implement compiling and executing of the inputted initial quantum program in the target quantum computer. The compiling process is responsible for transforming the inputted initial quantum program containing the classical control into a series of physical circuits capable of being executed by the particular quantum computer. For convenient description, the physical quantum bit in the structural diagram is marked as v, and the logical quantum bit in the initial quantum program is marked as q.

Specific steps of compiling are as follows.

S1: Execute a classical control flow deriving subprogram on the inputted initial quantum program to obtain a directed graph matching a classical control flow of the initial quantum program.

Each node in the directed graph represents a specific logical quantum circuit, an outgoing edge of the node corresponds to a measurement result of the logical quantum circuit, and a target node corresponding to the outgoing edge represents a logical quantum circuit to be executed subsequently in a case of obtaining the measurement result. Two special nodes are further defined in the directed graph and are an initial node and a termination node respectively. The initial node contains a quantum circuit to be executed in an initial state of the quantum program. An outgoing degree of the termination node is 0, and the termination node contains a termination logical quantum circuit of the quantum program.

Specifically, input of the classical control flow deriving subprogram is the initial quantum program, and its detailed steps are as follows.

S1-1: Generate a corresponding node for each logical quantum circuit in the initial quantum program.

S1-2: Mark a node corresponding to an initial logical quantum circuit as the initial node and a node corresponding to the termination logical quantum circuit as the termination node.

S1-3: Generate edges $(i, j_0), (i, j_1), \ldots, (i, j_{2^n-1})$ for all the measurement operations in the initial quantum program, where i represents a serial number of the logical quantum circuit node where the measurement operation is located, $j_m$ represents a serial number of the logical quantum circuit node to be executed after m measurement results are obtained, and n represents the number of the measured quantum bits.

S1-4: Return to the directed graph generated based on the nodes and the edges.

S2: Take out any non-transformed node, marked as i, of the directed graph, where the logical quantum circuit represented by the node is marked as $LC_i$.

S3: Execute a quantum circuit transformation subprogram on $LC_i$, mark a physical circuit obtained after transformation as $PC_i$, and mark the initial and final quantum bit mapping of $PC_i$ as $\tau_i^{ini}$ and $\tau_i^{fin}$.

The quantum circuit transformation subprogram is the structural diagram, one initial quantum bit mapping needs to be determined first, then the redundant swap gate operation is introduced, the logical quantum circuit is transformed into the executable physical quantum circuit, so that the generated physical quantum circuit is equivalent to the logical quantum circuit in function, and the two-quantum-bit gates therein meet the connectivity limit of the structural diagram of the quantum computer, and thus the quantum circuit can be executed in the particular quantum computer.

Specifically, input of the quantum circuit transformation subprogram is a logical quantum circuit LC and the structural diagram of the quantum computer, and one physical quantum circuit PC, one initial quantum bit mapping $\tau^{ini}$ and one final quantum bit mapping $\tau^{fin}$ meeting the connectivity limit of the structural diagram are returned. Detailed steps are as follows:

S3-1: Construct the initial quantum bit mapping relationship $\tau^{ini}$, where the mapping is to map the logical quantum bit $q_i$ to the physical quantum bit $v_i$.

S3-2: Construct a null physical quantum circuit PC and simultaneously construct current quantum bit mapping $\tau = \tau^{ini}$.

S3-3: Take out a quantum gate, marked as G( ), from a leftmost side of the logical quantum circuit LC.

S3-4: Add $G(\tau(q))$ to a tail position of the physical quantum circuit PC if G( ) is the single-quantum-bit gate G(q) acting on the logical quantum bit q, and then enter S3-6.

S3-5: Construct a path, marked as $(\tau(q_i), v_{k_0}, v_{k_1}, \ldots, v_{k_{l-2}}, \tau(q_j))$, between the physical quantum bits $\tau(q_i)$ and $\tau(q_j)$ on the structural diagram if G( ) is the two-quantum-bit gate $G(q_i, q_j)$ acting on the logical quantum bits $(q_i, q_j)$, where l is the path length (l>2).

S3-6: Introduce swap gates $SWAP(\tau(q_i), v_{k_0})$, $SWAP(v_{k_0}, v_{k_1})$ ... $SWAP(v_{k_{l-3}}, v_{k_{l-2}})$ and $G(v_{k_{l-2}}, \tau(q_j))$ into the physical quantum circuit PC based on the constructed path, and update the quantum bit mapping relationship $\tau$ according to the introduced swap gates.

S3-7: Remove the taken-out quantum gate from the logical quantum circuit LC, enter the next step when the number of the quantum gates is reduced to 0, and otherwise, enter S3-3.

S3-8: Return the physical quantum circuit PC, the initial quantum bit mapping relationship $\tau^{ini}$ and the final quantum bit mapping relationship $\tau^{fin}$, and set $\tau^{fin}=\tau$ to implement updating of the quantum bit mapping relationship.

S4: Enter S5 if transformation of all the nodes in the structural diagram is completed, and otherwise, enter S2.

S5: Take out any non-transformed edge, marked as (i, j), of the directed graph, where i is a source node of the edge, and j is a target node of the edge.

S6: Execute the quantum bit mapping transformation subprogram with the initial quantum bit mapping relationship $\tau_i^{fin}$ as the initial mapping relationship and the final quantum bit mapping relationship tint as the target mapping relationship, construct the mapping transformation circuit needing to be executed for transformation, and mark it as $PC_{i,j}$.

Specifically, input of the quantum bit mapping transformation subprogram is the initial mapping relationship $\tau^{ini}$, the target mapping relationship $\tau^{fin}$ and the structural diagram corresponding to the quantum computer, and output is the constructed mapping transformation physical circuit PC, which can transform quantum bit mapping $\tau^{ini}$ to $\tau^{fin}$. Detailed steps of the quantum bit mapping transformation subprogram are as follows.

S6-1: Construct a null physical quantum circuit PC and simultaneously construct the current quantum bit mapping relationship $\tau=\tau^{ini}$.

S6-2: Take out a physical quantum bit, marked as $v_j$, from the structural diagram, where the physical quantum bit needs to meet that the structural diagram is still a connected graph after $v_j$ is removed.

S6-3: Search for a logical quantum bit q meeting $\tau^{fin}(q)=v_j$ and meanwhile, set $v_i=\tau(q)$ based on the current quantum bit mapping relationship $\tau$.

S6-4: Construct a path, marked as $(v_i, v_{k_0}, v_{k_1}, \ldots, v_{k_{l-2}}, v_j)$, between physical quantum bits $v_i$ and $v_j$ on the structural diagram, where l is the path length.

S6-5: Introduce swap gates $SWAP(v_i, v_{k_0})$, $SWAP(v_{k_0}, v_{k_1})$ ... and $SWAP(v_{k_{l-2}}, v_j)$ into the physical quantum circuit PC based on the constructed path, and update the quantum bit mapping relationship t according to the introduced swap gates.

S6-6: Remove the taken-out physical quantum bit $v_j$ from the structural diagram.

S6-7: Enter the next step if the number of the nodes in the structural diagram is 0, and otherwise, enter S6-2.

S6-8: Return to the mapping transformation circuit $PC_{i,j}$.

The executing process may implement one executing process of one compiled quantum program in the particular quantum computer through a particular scheduling method. The executing process is right after the compiling process and specific steps are as follows.

S7: Take out the initial node of the compiled target quantum program as a current node, which is marked as i.

S8: Execute the physical quantum circuit $PC_i$ represented by the node i in the quantum computer to obtain the measurement result m.

S9: Enter S12 if the node i is the termination node, and otherwise, enter the next step.

S10: Determine an outgoing edge, marked as (i, j), of a corresponding node i according to the result m, where j is a target node of the outgoing edge.

S11: Execute the mapping transformation circuit $PC_{i,j}$ needing to be executed for mapping transformation, assign j to i to serve as the current node, and enter S8.

S12: Feed back that executing for the quantum program is finished to obtain the executing result.

Compiling and executing of the quantum program containing classical control may be implemented through the above method, and a problem that a conventional method can process only a simple logical quantum circuit without the classical control flow is overcome. The executing and scheduling process of the quantum program containing the classical control is represented by deriving the classical control flow, a series of physical quantum circuits are obtained by repeatedly calling a quantum circuit transformation algorithm and a quantum bit mapping transformation algorithm, these physical quantum circuits may meet the executing condition of the particular quantum computer, and thus the quantum program containing the classical control is run on the particular quantum computer.

It is to be understood that, although the steps are displayed sequentially according to the instructions of the arrows in the flowcharts involved in the above embodiments, these steps are not necessarily performed sequentially according to the order instructed by the arrows. Unless otherwise explicitly specified herein, execution of these steps is not strictly limited in terms of an order, and these steps may be executed in other orders. Moreover, at least part of the steps in the flowcharts involved in the above embodiments may include a plurality of steps or a plurality of stages. These steps or stages are not necessarily performed at the same moment but may be performed at different moments. Execution of these steps or stages is not necessarily sequentially performed, but may be performed alternately with other steps or at least part of steps or stages of other steps.

Based on the same inventive concept, embodiments of this application further provide an apparatus for executing a quantum program for implementing the above method for executing the quantum program and an apparatus for compiling a quantum program for implementing the above method for compiling the quantum program. Implementation solutions of solving problems provided by the apparatuses are similar to the implementation solutions recorded in the above methods, so that specific limits in the embodiments of the executing apparatus and the compiling apparatus for one or more quantum programs provided below may refer to the limits of the method for executing the quantum program and the method for compiling the quantum program above, which will not be repeated here.

Figure 12:
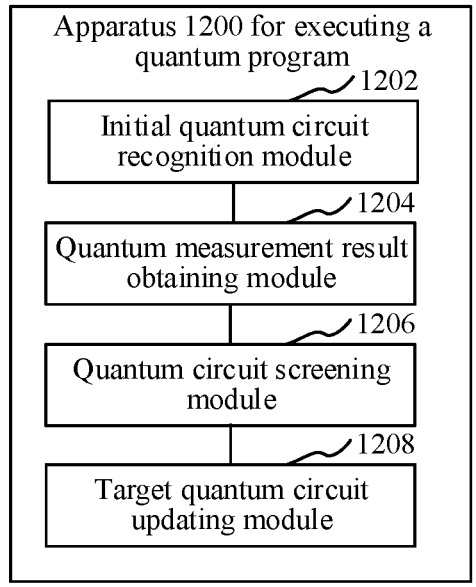
FIG. 12 is a structural block diagram of an apparatus for executing a quantum program in an embodiment.

In an embodiment, as shown in FIG. 12, an apparatus 1200 for executing a quantum program is provided and includes: an initial quantum circuit recognition module 1202, a quantum measurement result obtaining module 1204, a quantum circuit screening module 1206 and a target quantum circuit updating module 1208.

The initial quantum circuit recognition module 1202 is configured to use an initial quantum circuit in a physical quantum circuit contained in a target quantum program as a current quantum circuit.

The quantum measurement result obtaining module 1204 is configured to execute the current quantum circuit to obtain a quantum measurement result.

The quantum circuit screening module 1206 is configured to screen out a target quantum circuit matching the quantum measurement result from candidate quantum circuits having a connection relationship with the current quantum circuit, the connection relationship matching a control flow corresponding to the target quantum program.

The target quantum circuit updating module 1208 is configured to use the target quantum circuit as the current quantum circuit by executing a mapping transformation circuit between the current quantum circuit and the target quantum circuit, and skip to the quantum measurement result obtaining module to continue executing till a program executing result is obtained in response to meeting an executing termination condition.

In an embodiment, the apparatus for executing the quantum program further includes a compiling module. The compiling module is configured to compile an initial quantum program according to a control flow of the initial quantum program based on an executing condition corresponding to a quantum program executing environment to obtain the target quantum program.

Each physical quantum circuit contained in the target quantum program corresponds to each node of the control flow, and the mapping transformation circuits among all the physical quantum circuits correspond to connection relationships among all the nodes.

In an embodiment, the compiling module includes a logical quantum circuit split module, a quantum circuit transformation module, a mapping relationship transformation module and an integration module.

The logical quantum circuit split module is configured to determine a plurality of logical quantum circuits contained in the initial quantum program and connection relationships among all the logical quantum circuits according to the control flow of the initial quantum program.

The quantum circuit transformation module is configured to transform each logical quantum circuit into a physical quantum circuit respectively according to an executing condition corresponding to a quantum program executing environment.

The mapping relationship transformation module is configured to perform transformation of a quantum bit mapping relationship on two physical quantum circuits having a connection relationship based on mapping, among the physical quantum circuits, of the connection relationships among all the logical quantum circuits to obtain a mapping transformation circuit.

The integration module is configured to determine the target quantum program including the physical quantum circuits and the mapping transformation circuit.

In an embodiment, the mapping relationship transformation module is further configured to determine a connection relationship between the physical quantum circuits based on mapping, among the physical quantum circuits, of the connection relationships among all the logical quantum circuits: obtain a final quantum bit mapping relationship corresponding to a source physical quantum circuit and an initial quantum bit mapping relationship corresponding to a target physical quantum circuit from the two physical quantum circuits having the connection relationship; and obtain the mapping transformation circuit of transforming the final quantum bit mapping relationship into the initial quantum bit mapping relationship through mapping relationship transformation.

In an embodiment, the mapping relationship transformation module is further configured to determine a first physical quantum bit from a structural diagram representing an executing condition, the first physical quantum bit being a physical quantum bit that does not affect a quantum bit connected relationship in the structural diagram after being removed from the structural diagram: determine a logical quantum bit corresponding to the first physical quantum bit based on the final quantum bit mapping relationship and determine a second physical quantum bit corresponding to the logical quantum bit based on the initial quantum bit mapping relationship: determine a connection path between a first quantum bit and a second quantum bit in the structural diagram; and introduce a swap gate according to the connection path to obtain the mapping transformation circuit of transforming the final quantum bit mapping relationship into the initial quantum bit mapping relationship.

In an embodiment, the quantum circuit transformation module is further configured to determine a quantum bit connected relationship corresponding to the quantum program executing environment based on the quantum program executing environment; and perform quantum circuit transformation on each logical quantum circuit according to the quantum bit connected relationship to obtain the physical quantum circuit.

In an embodiment, the quantum circuit transformation module is further configured to sequentially determine, based on an arrangement order of each quantum gate in the logical quantum circuit, a target physical quantum bit having a mapping relationship with a logical quantum bit on which the quantum gate acts according to the quantum bit connected relationship: add the quantum gate to the target physical quantum bit corresponding to the logical quantum bit acted on and remove the quantum gate from the logical quantum circuit; and obtain the physical quantum circuit corresponding to the logical quantum circuit in response to that the number of quantum gates of the logical quantum circuit is zero.

In an embodiment, the quantum circuit transformation module is further configured to determine a physical quantum bit mapped by a logical quantum bit based on the quantum bit mapping relationship in response to that the quantum gate is a single-bit quantum gate with the number of logical quantum bits acted on being 1; and perform mapping relationship updating on the quantum bit mapping relationship by introducing a swap gate and determine physical quantum bits mapped by logical quantum bits based on an updated quantum bit mapping relationship in response to that the quantum gate is a two-bit quantum gate with the number of logical quantum bits acted on being 2.

In an embodiment, the quantum circuit transformation module is further configured to map the two logical quantum bits on which the two-bit quantum gate acts into a first physical quantum bit and a second physical quantum bit respectively by constructing an initial quantum bit mapping relationship: determine a connection path between the first physical quantum bit and the second physical quantum bit according to the quantum bit connected relationship; and introduce the swap gate based on the connection path and update the initial quantum bit mapping relationship to obtain the updated quantum bit mapping relationship.

In an embodiment, the target quantum circuit updating module is further configured to use the target quantum circuit as the current quantum circuit in response to that the target quantum circuit is not a termination quantum circuit and skip to the quantum measurement result obtaining module to continue executing; and execute the termination quantum circuit in response to that the target quantum circuit is the termination quantum circuit to obtain an executing result of the target quantum program.

In an embodiment, the apparatus further includes: a quantum measurement module which is configured to perform a quantum measurement operation on a target quantum bit in the current quantum circuit in response to an executing starting event for the current quantum circuit; and obtain the quantum measurement result corresponding to the target quantum bit in response to finishing executing for the current quantum circuit.

In an embodiment, the quantum measurement module is further configured to determine a target quantum gate used for performing a measurement operation in the current quantum circuit and the target quantum bit matching the target quantum gate in response to the executing starting event for the current quantum circuit; and perform the measurement operation on state data of the target quantum bit matching the target quantum gate based on the target quantum gate.

In an embodiment, a plurality of target quantum bits are provided. The quantum measurement module is further configured to read binary bit data for representing the quantum measurement result from each target quantum gate in response to finishing executing for the current quantum circuit; and use a binary bit string composed of each binary bit data as the quantum measurement result.

Each module in the apparatus for executing the quantum program above may be implemented entirely or partially through software, hardware, or a combination thereof. Each module above may be embedded into or independent of one or more processors in the quantum computer in a hardware form, and may also be stored in a memory in the quantum computer in a software form so that the one or more processors can call and execute operations corresponding to the above modules.

Figure 13:
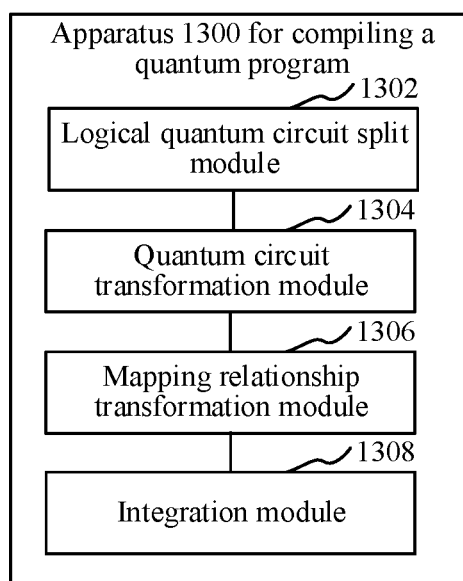
FIG. 13 is a structural block diagram of an apparatus for compiling a quantum program in an embodiment.

In an embodiment, as shown in FIG. 13, an apparatus 1300 for compiling a quantum program is provided and includes: a logical quantum circuit split module 1302, a quantum circuit transformation module 1304, a mapping relationship transformation module 1306 and an integration module 1308.

The logical quantum circuit split module 1302 is configured to determine a plurality of logical quantum circuits contained in an initial quantum program and connection relationships among all the logical quantum circuits according to a control flow of the initial quantum program.

The quantum circuit transformation module 1304 is configured to transform each logical quantum circuit into a physical quantum circuit respectively according to an executing condition corresponding to a quantum program executing environment.

The mapping relationship transformation module 1306 is configured to perform transformation of a quantum bit mapping relationship on two physical quantum circuits having a connection relationship based on mapping, among the physical quantum circuits, of the connection relationships among all the logical quantum circuits to obtain a mapping transformation circuit.

The integration module 1308 is configured to use a target quantum program including the physical quantum circuits and the mapping transformation circuit as a compiling result of the initial quantum program.

In an embodiment, the quantum circuit transformation module is further configured to establish a directed graph with the logical quantum circuits as nodes and the connection relationships among all the logical quantum circuits as connection edges among the nodes; and perform quantum circuit transformation according to the executing condition corresponding to the quantum program executing environment based on each to-be-transformed node of the directed graph, so as to transform the logical quantum circuit represented by each to-be-transformed node into the physical quantum circuit respectively.

The mapping relationship transformation module is further configured to perform transformation of initial and final quantum bit mapping relationships on physical quantum circuits connected with each to-be-transformed connection edge based on each to-be-transformed connection edge of the directed graph to obtain the mapping transformation circuit.

In an embodiment, the mapping relationship transformation module is further configured to determine a connection relationship between the physical quantum circuits based on mapping, among the physical quantum circuits, of the connection relationships among all the logical quantum circuits: obtain a final quantum bit mapping relationship corresponding to a source physical quantum circuit and an initial quantum bit mapping relationship corresponding to a target physical quantum circuit from the two physical quantum circuits having the connection relationship; and obtain the mapping transformation circuit of transforming the final quantum bit mapping relationship into the initial quantum bit mapping relationship through mapping relationship transformation.

In an embodiment, the mapping relationship transformation module is further configured to determine a first physical quantum bit from a structural diagram representing an executing condition, the first physical quantum bit being a physical quantum bit that does not affect a quantum bit connected relationship in the structural diagram after being removed from the structural diagram: determine a logical quantum bit corresponding to the first physical quantum bit based on the final quantum bit mapping relationship and determine a second physical quantum bit corresponding to the logical quantum bit based on the initial quantum bit mapping relationship: determine a connection path between a first quantum bit and a second quantum bit in the structural diagram; and introduce a swap gate according to the connection path to obtain the mapping transformation circuit of transforming the final quantum bit mapping relationship into the initial quantum bit mapping relationship.

In an embodiment, the quantum circuit transformation module is further configured to determine a quantum bit connected relationship corresponding to the quantum program executing environment based on the quantum program executing environment; and perform quantum circuit transformation on each logical quantum circuit according to the quantum bit connected relationship to obtain the physical quantum circuit.

In an embodiment, the quantum circuit transformation module is further configured to sequentially determine, based on an arrangement order of each quantum gate in the logical quantum circuit, a target physical quantum bit having a mapping relationship with a logical quantum bit on which the quantum gate acts according to the quantum bit connected relationship: add the quantum gate to the target physical quantum bit corresponding to the logical quantum bit acted on and remove the quantum gate from the logical quantum circuit; and obtain the physical quantum circuit corresponding to the logical quantum circuit in response to that the number of quantum gates of the logical quantum circuit is zero.

In an embodiment, the quantum circuit transformation module is further configured to determine a physical quantum bit mapped by a logical quantum bit based on the quantum bit mapping relationship in response to that the quantum gate is a single-bit quantum gate with the number of logical quantum bits acted on being 1; and perform mapping relationship updating on the quantum bit mapping relationship by introducing a swap gate and determine physical quantum bits mapped by logical quantum bits based on an updated quantum bit mapping relationship in response to that the quantum gate is a two-bit quantum gate with the number of logical quantum bits acted on being 2.

In an embodiment, the quantum circuit transformation module is further configured to map the two logical quantum bits on which the two-bit quantum gate acts into a first physical quantum bit and a second physical quantum bit respectively by constructing an initial quantum bit mapping relationship: determine a connection path between the first physical quantum bit and the second physical quantum bit according to the quantum bit connected relationship; and introduce the swap gate based on the connection path and update the initial quantum bit mapping relationship to obtain the updated quantum bit mapping relationship.

Figure 14:
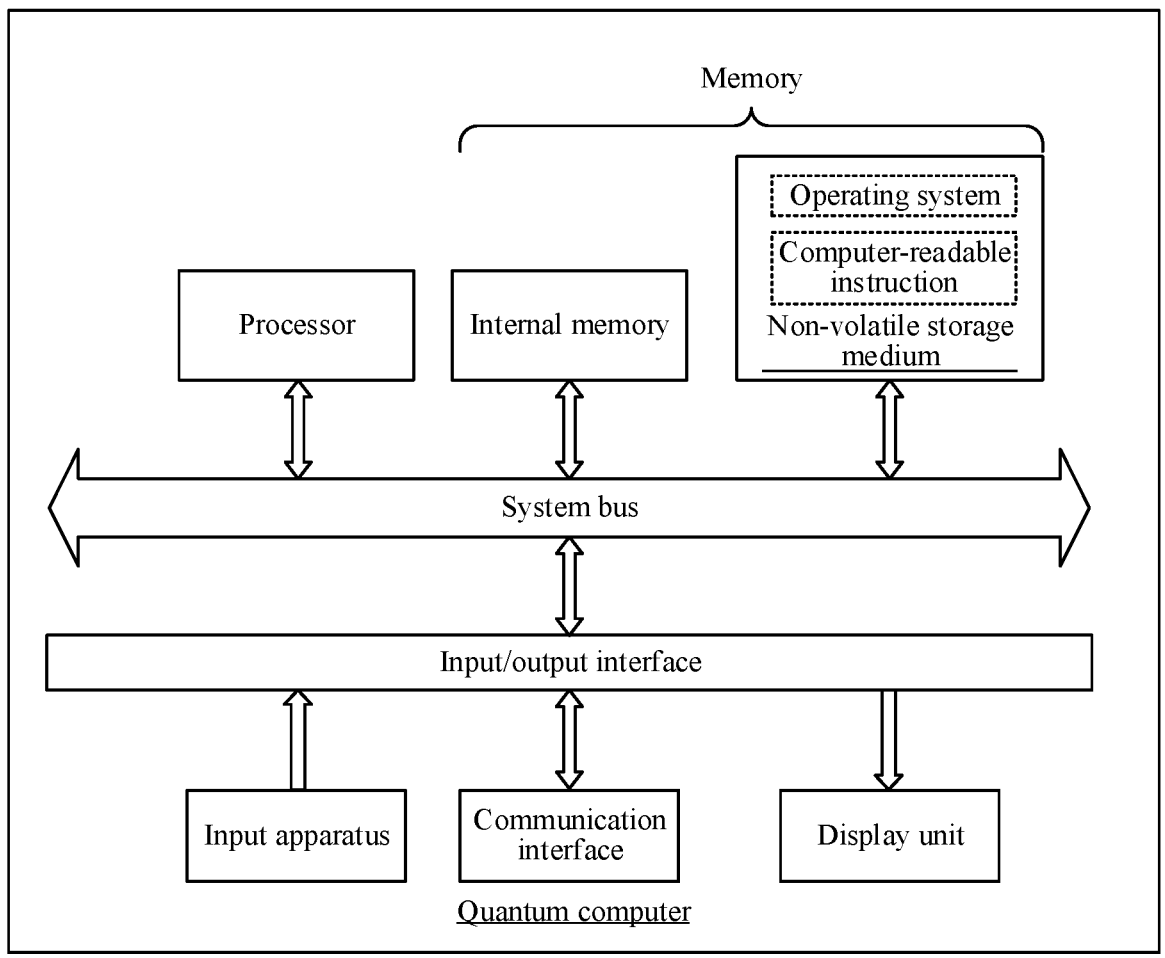
FIG. 14 is a diagram of an internal structure of a quantum computer in an embodiment.

In an embodiment, a quantum computer is provided and may be a terminal, and a diagram of an internal structure thereof may be shown in FIG. 14. The quantum computer includes one or more processors, a memory, a communication interface, a display screen and an input apparatus that are connected by using a system bus. The one or more processors of the quantum computer are configured to provide computation and control ability. The memory of the quantum computer includes a non-volatile storage medium and an internal memory. The non-volatile storage medium stores an operating system and a computer-readable instruction. The internal memory provides an environment for running of the operating system and the computer-readable instruction in the non-volatile storage medium. The communication interface of the quantum computer is configured to communicate with an external terminal in a wired or wireless mode, and the wireless mode may be implemented through WIFI, a mobile cellular network, a near-field communication (NFC) or other technologies. The computer-readable instruction implements, when executed by the one or more processors, a method for executing a quantum program and a method for compiling a quantum program. The display screen of the quantum computer may be a liquid crystal display screen or an e-ink display screen. The input apparatus of the quantum computer may be a touch layer covering the display screen, or may be a button, a trackball, or a touchpad disposed on a housing of the quantum computer, or may be an external keyboard, a touchpad, a mouse or the like.

A person skilled in the art may understand that the structure shown in FIG. 14 is only a block diagram of a partial structure related to the solution of this application, and does not limit the quantum computer to which the solution of this application is applied. Specifically, the quantum computer may include more or less components than those shown in the figure, or some components may be combined, or different component deployment may be used.

In an embodiment, a quantum computer is further provided and includes a memory and one or more processors, the memory storing a computer-readable instruction, and the one or more processors implementing, when executing the computer-readable instruction, steps in the above various method embodiments.

In an embodiment, a computer-readable storage medium is provided, and stores a computer-readable instruction, a computer program implementing, when being executed by one or more processors, steps in the above various method embodiments.

In an embodiment, a computer program product or a computer program is provided, the computer program product or the computer program including a computer-readable instruction, and the computer-readable instruction being stored in a computer-readable storage medium. One or more processors of a computer device read the computer-readable instruction from the computer-readable storage medium and execute the computer-readable instruction so that the computer device executes steps in the above various method embodiments.

As information (including but not limited to user equipment information, user personal information and the like) and data (including but not limited to data for analysis, stored data, exposed data and the like) involved in this application are information and data permitted by a user or fully permitted by each party.

A person of ordinary skill in the art may understand that implementation of all or some of procedures of the methods in the foregoing embodiments may be completed by commanding related hardware by a computer-readable instruction. The computer-readable instruction may be stored in a non-volatile computer-readable storage medium. When the computer-readable instruction is executed, the procedures of the above various method embodiments may be included. Any references to the memory, the database, or other media used in the embodiments provided in this application may all include at least one type of non-volatile or volatile memories. The non-volatile memory may include a read-only memory (ROM), a magnetic tape, a floppy disk, a flash memory, an optical memory, a high-density embedded non-volatile memory, a resistive random access memory (Re-RAM), a magnetoresistive random access memory (MRAM), a ferroelectric random access memory (FRAM), a phase change memory (PCM), a graphene memory and the like. The volatile memory may include a random access memory (RAM) or an external cache or the like. As explanation but not limitation, the RAM may be in various forms, for example, a static random access memory (SRAM) or a dynamic random access memory (DRAM) and the like. The database involved in the various embodiments provided by this application may include at least one type of a relational database and a non-relational database. The non-relational database may include a distributed database based on a blockchain but is not limited to this. The processor involved in the various embodiments provided by this application may be a general-purpose processor, a central processor, a graphics processor, a digital signal processor, a programmable logic device, a data processing logic device based on quantum computing and the like but is not limited to this.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments show only several implementations of this application and are described in detail, which, however, are not to be construed as a limitation to the patent scope of this application. For a person of ordinary skill in the art, several transformations and improvements can be made without departing from the idea of this application. These transformations and improvements belong to the protection scope of this application. Therefore, the protection scope of this application shall be subject to the appended claims.

What is claimed is:

1. A method for executing a quantum program performed by a computer device, the method comprising:
   using an initial quantum circuit in a physical quantum circuit contained in a target quantum program as a current quantum circuit;
   executing the current quantum circuit to obtain a quantum measurement result;
   identifying a target quantum circuit matching the quantum measurement result from candidate quantum circuits having a connection relationship with the current quantum circuit, the connection relationship matching a control flow corresponding to the target quantum program;
   using the target quantum circuit as the current quantum circuit by executing a mapping transformation circuit between the current quantum circuit and the target quantum circuit; and
   returning to the operation of executing the current quantum circuit to obtain a quantum measurement result to continue executing till a program executing result is obtained in response to meeting an executing termination condition.

2. The method according to claim 1, further comprising:
   compiling an initial quantum program according to a control flow of the initial quantum program based on an executing condition corresponding to a quantum program executing environment to obtain the target quantum program;
   each physical quantum circuit contained in the target quantum program corresponding to each node of the control flow, and the mapping transformation circuits among all the physical quantum circuits corresponding to connection relationships among all the nodes.

3. The method according to claim 2, wherein, the compiling an initial quantum program containing a control flow according to an executing condition corresponding to a quantum program executing environment to obtain the target quantum program comprises:
   determining a plurality of logical quantum circuits contained in an initial quantum program and connection relationships among all the logical quantum circuits according to a control flow of the initial quantum program;
   transforming each logical quantum circuit into a physical quantum circuit respectively according to an executing condition corresponding to a quantum program executing environment;
   performing transformation of a quantum bit mapping relationship on two physical quantum circuits having a connection relationship based on mapping, among the physical quantum circuits, of the connection relationships among all the logical quantum circuits to obtain a mapping transformation circuit; and
   determining the target quantum program comprising the physical quantum circuits and the mapping transformation circuit.

4. The method according to claim 1, wherein the using the target quantum circuit as the current quantum circuit by executing a mapping transformation circuit between the current quantum circuit and the target quantum circuit, and returning to the operation of executing the current quantum circuit to obtain a quantum measurement result to continue executing till a program executing result is obtained in response to meeting an executing termination condition comprise:
   using the target quantum circuit as the current quantum circuit by executing the mapping transformation circuit between the current quantum circuit and the target quantum circuit in response to that the target quantum circuit is not a termination quantum circuit;
   returning to the operation of executing the current quantum circuit to obtain a quantum measurement result to continue executing; and
   executing the termination quantum circuit in response to that the target quantum circuit is the termination quantum circuit to obtain an executing result of the target quantum program.

5. The method according to claim 1, further comprising:
   performing a quantum measurement operation on a target quantum bit in the current quantum circuit in response to an executing starting event for the current quantum circuit; and
   the executing the current quantum circuit to obtain a quantum measurement result comprising:
   obtaining the quantum measurement result corresponding to the target quantum bit in response to finishing executing for the current quantum circuit.

6. The method according to claim 5, wherein, the performing a quantum measurement operation on a target quantum bit in the current quantum circuit in response to an executing starting event for the current quantum circuit comprises:
   determining a target quantum gate used for performing a measurement operation in the current quantum circuit and the target quantum bit matching the target quantum gate in response to the executing starting event for the current quantum circuit; and
   performing the measurement operation on state data of the target quantum bit matching the target quantum gate based on the target quantum gate.

7. The method according to claim 5, wherein, a plurality of target quantum bits are provided; and
   the obtaining the quantum measurement result corresponding to the target quantum bit in response to finishing executing for the current quantum circuit comprises:
   reading binary bit data representing the quantum measurement result from a target quantum gate used for performing a quantum measurement in response to finishing executing for the current quantum circuit; and
   using a binary bit string composed of each binary bit data as the quantum measurement result.

8. A method for compiling a quantum program performed by a computer device, the method comprising:
   determining a plurality of logical quantum circuits contained in an initial quantum program and connection relationships among all the logical quantum circuits according to a control flow of the initial quantum program;
   transforming each logical quantum circuit into a physical quantum circuit respectively according to an executing condition corresponding to a quantum program executing environment;
   performing transformation of a quantum bit mapping relationship on two physical quantum circuits having a connection relationship based on mapping, among the physical quantum circuits, of the connection relationships among all the logical quantum circuits to obtain a mapping transformation circuit; and using a target quantum program comprising the physical quantum circuits and the mapping transformation circuit as a compiling result of the initial quantum program.

9. The method according to claim 8, wherein, the transforming each logical quantum circuit into a physical quantum circuit respectively according to an executing condition corresponding to a quantum program executing environment; and performing transformation of a quantum bit mapping relationship on two physical quantum circuits having a connection relationship based on mapping, among the physical quantum circuits, of the connection relationships among all the logical quantum circuits to obtain a mapping transformation circuit comprise:

establishing a directed graph with the logical quantum circuits as nodes and the connection relationships among all the logical quantum circuits as connection edges among the nodes;

performing quantum circuit transformation according to the executing condition corresponding to the quantum program executing environment based on each to-be-transformed node of the directed graph, so as to transform the logical quantum circuit represented by each to-be-transformed node into the physical quantum circuit respectively; and performing transformation of initial and final quantum bit mapping relationships on physical quantum circuits connected with each to-be-transformed connection edge based on each to-be-transformed connection edge of the directed graph to obtain the mapping transformation circuit.

10. A computer device, comprising a memory and a processor, the memory storing a computer-readable instruction that, when executed by the processor, causes the computer device to perform a method for executing a quantum program, the method including:

using an initial quantum circuit in a physical quantum circuit contained in a target quantum program as a current quantum circuit;

executing the current quantum circuit to obtain a quantum measurement result;

identifying a target quantum circuit matching the quantum measurement result from candidate quantum circuits having a connection relationship with the current quantum circuit, the connection relationship matching a control flow corresponding to the target quantum program;

using the target quantum circuit as the current quantum circuit by executing a mapping transformation circuit between the current quantum circuit and the target quantum circuit; and returning to the operation of executing the current quantum circuit to obtain a quantum measurement result to continue executing till a program executing result is obtained in response to meeting an executing termination condition.

11. The computer device according to claim 10, wherein the method further comprises:

compiling an initial quantum program according to a control flow of the initial quantum program based on an executing condition corresponding to a quantum program executing environment to obtain the target quantum program;

each physical quantum circuit contained in the target quantum program corresponding to each node of the control flow, and the mapping transformation circuits among all the physical quantum circuits corresponding to connection relationships among all the nodes.

12. The computer device according to claim 11, wherein, the compiling an initial quantum program containing a control flow according to an executing condition corresponding to a quantum program executing environment to obtain the target quantum program comprises:

determining a plurality of logical quantum circuits contained in an initial quantum program and connection relationships among all the logical quantum circuits according to a control flow of the initial quantum program;

transforming each logical quantum circuit into a physical quantum circuit respectively according to an executing condition corresponding to a quantum program executing environment;

performing transformation of a quantum bit mapping relationship on two physical quantum circuits having a connection relationship based on mapping, among the physical quantum circuits, of the connection relationships among all the logical quantum circuits to obtain a mapping transformation circuit; and determining the target quantum program comprising the physical quantum circuits and the mapping transformation circuit.

13. The computer device according to claim 10, wherein the using the target quantum circuit as the current quantum circuit by executing a mapping transformation circuit between the current quantum circuit and the target quantum circuit, and returning to the operation of executing the current quantum circuit to obtain a quantum measurement result to continue executing till a program executing result is obtained in response to meeting an executing termination condition comprise:

using the target quantum circuit as the current quantum circuit by executing the mapping transformation circuit between the current quantum circuit and the target quantum circuit in response to that the target quantum circuit is not a termination quantum circuit;

returning to the operation of executing the current quantum circuit to obtain a quantum measurement result to continue executing; and executing the termination quantum circuit in response to that the target quantum circuit is the termination quantum circuit to obtain an executing result of the target quantum program.

14. The computer device according to claim 10, wherein the method further comprises:

performing a quantum measurement operation on a target quantum bit in the current quantum circuit in response to an executing starting event for the current quantum circuit; and the executing the current quantum circuit to obtain a quantum measurement result comprising:

obtaining the quantum measurement result corresponding to the target quantum bit in response to finishing executing for the current quantum circuit.

15. The computer device according to claim 14, wherein, the performing a quantum measurement operation on a target quantum bit in the current quantum circuit in response to an executing starting event for the current quantum circuit comprises:

determining a target quantum gate used for performing a measurement operation in the current quantum circuit and the target quantum bit matching the target quantum gate in response to the executing starting event for the current quantum circuit; and performing the measurement operation on state data of the target quantum bit matching the target quantum gate based on the target quantum gate.

16. The computer device according to claim 14, wherein a plurality of target quantum bits are provided; and the obtaining the quantum measurement result corresponding to the target quantum bit in response to finishing executing for the current quantum circuit comprises:

reading binary bit data representing the quantum measurement result from a target quantum gate used for performing a quantum measurement in response to finishing executing for the current quantum circuit; and using a binary bit string composed of each binary bit data as the quantum measurement result.

\* \* \* \* \*